United States Patent
Shih et al.

(10) Patent No.: US 11,615,640 B2
(45) Date of Patent: Mar. 28, 2023

(54) DRIVING DEVICE AND OPERATION METHOD THEREOF

(71) Applicant: Novatek Microelectronics Corp., Hsinchu (TW)

(72) Inventors: Wei-Lun Shih, Hsinchu (TW); Wu Wei Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 248 days.

(21) Appl. No.: 17/155,116

(22) Filed: Jan. 22, 2021

(65) Prior Publication Data

US 2021/0224548 A1 Jul. 22, 2021

Related U.S. Application Data

(60) Provisional application No. 62/964,137, filed on Jan. 22, 2020.

(51) Int. Cl.
| | |
|---|---|
| *G06K 9/20* | (2006.01) |
| *G06K 9/36* | (2006.01) |
| *G06V 40/13* | (2022.01) |
| *H04L 67/12* | (2022.01) |
| *G09G 3/36* | (2006.01) |
| *G06V 20/40* | (2022.01) |
| *G06V 10/147* | (2022.01) |
| *G06V 40/12* | (2022.01) |

(52) U.S. Cl.
CPC ........ *G06V 40/1318* (2022.01); *G06V 10/147* (2022.01); *G06V 20/46* (2022.01); *G06V 40/1347* (2022.01); *G09G 3/3614* (2013.01); *H04L 67/12* (2013.01)

(58) Field of Classification Search
CPC .......................... G06V 40/1318; G09G 3/3614
See application file for complete search history.

(56) References Cited

U.S. PATENT DOCUMENTS

2017/0025068 A1* 1/2017 Jeoung ................. G09G 3/3266
2018/0349667 A1* 12/2018 Kim ........................ G09G 5/00

OTHER PUBLICATIONS

CCOHS, "Computer Monitors and Display Colours", Canadian Centre for Occupational Health and Safety, Govt. of Canada, 2022, pp. 1-6. (Year: 2022).*

* cited by examiner

*Primary Examiner* — Brian Werner
(74) *Attorney, Agent, or Firm* — JCIPRNET

(57) ABSTRACT

A driving device and an operation method thereof are provided. The driving device includes a first driving circuit and a second driving circuit. The first driving circuit performs a display driving operation to a display panel. The second driving circuit performs a fingerprint sensing operation (including a sensor reset operation and an image capture operation) to the display panel according to a timing control signal of the first driving circuit. The fingerprint sensing operation is operated with a same frame polarity configuration rule. The operation of "the same frame polarity configuration rule" comprises fixing a relation between a first polarity configuration (which is the frame polarity configuration of the display panel when performing the sensor reset operation on a same fingerprint frame) and a second polarity configuration (which is the frame polarity configuration of the display panel when performing the image capture operation on the same fingerprint frame) whenever the fingerprint sensing operation is performed.

44 Claims, 26 Drawing Sheets

DRIVING DEVICE AND OPERATION METHOD THEREOF

CROSS-REFERENCE TO RELATED APPLICATION

This application claims the priority benefit of U.S. provisional application Ser. No. 62/964,137, filed on Jan. 22, 2020. The entirety of the above-mentioned patent application is hereby incorporated by reference herein and made a part of this specification.

BACKGROUND

Technical Field

The disclosure relates to an electronic device, and particularly relates to a driving device and an operation method thereof.

Description of Related Art

In order to reduce the size of a display device, a fingerprint sensing region may be overlapped in a display region of a display panel. For example, under-display fingerprint recognition is to configure/attach a fingerprint sensor below (at back surface of) a display panel and the fingerprint sensor may sense/detect a fingerprint image through the display panel. Limited by the limitation of penetrating ability of a capacitive sensor, under-display fingerprint recognition often adopts the optical imaging or optical sensing technology. For under-display fingerprint recognition, since the display panel and the fingerprint sensor are different elements, the operation of the display panel may be independent from the operation of the fingerprint sensor.

In the under-display fingerprint recognition technology, the fingerprint sensor is configured outside the display panel. In any case, the total thickness of the display panel and the fingerprint sensor overlapped with each other is still not to be underestimated. Based on the design requirement of reducing the thickness of the display device, the in-display fingerprint recognition technology came into being. Different from under-display fingerprint recognition, in-display fingerprint recognition embeds a fingerprint sensor array in the display panel. That is, the display panel having an in-display fingerprint recognition function has a pixel circuit array and an in-display fingerprint sensor array. In the case where the display panel also has a touch sensing function, the display panel may have a pixel circuit array, an in-display touch sensor array, and an in-display fingerprint sensor array. Since the fingerprint sensor array is embedded in the display panel, the operation of the display function (and/or touch sensing function) often affects/interferes with the operation of the fingerprint sensing function. For in-display fingerprint recognition, how to improve the quality of a fingerprint image is a technical issue.

It should be noted that the content of "Description of Related Art" section is used to help understand the disclosure. Some of the content (or the entire content) disclosed in the "Description of Related Art" section may not be conventional technology known by persons with common knowledge in the art. The content disclosed in the "Description of Related Art" section does not represent that the content is already known by persons with common knowledge in the art before the application of the disclosure.

SUMMARY

The disclosure provides a driving device and an operation method thereof to improve the quality of a fingerprint image as much as possible.

In an embodiment of the disclosure, the driving device is configured to drive a display panel. The driving device includes a first driving circuit and a second driving circuit. The first driving circuit is configured to perform a display driving operation on the display panel, wherein the first driving circuit controls the display panel to perform polarity inversion between multiple frame polarity configurations when multiple display frames are displayed continuously, and the first driving circuit outputs a timing control signal. The second driving circuit is coupled to the first driving circuit to receive the timing control signal. The second driving circuit is configured to perform a fingerprint sensing operation on the display panel according to the timing control signal, wherein the fingerprint sensing operation is performed with a same frame polarity configuration rule. The fingerprint sensing operation includes a sensor reset operation and an image capture operation. The frame polarity configuration of the display panel when performing the sensor reset operation on a same fingerprint sensing area is referred to as a first polarity configuration. The frame polarity configuration of the display panel when performing the image capture operation on the same fingerprint sensing area is referred to as a second polarity configuration. The operation of "perform a fingerprint sensing operation on the display panel with a same frame polarity configuration rule" includes fixing a relation between the first polarity configuration and the second polarity configuration whenever the fingerprint sensing operation is performed.

In an embodiment of the disclosure, the operation method includes the following steps. A display driving operation is performed on a display panel by a first driving circuit, wherein the first driving circuit controls the display panel to perform polarity inversion between multiple frame polarity configurations when multiple display frames are displayed continuously. A timing control signal is output to a second driving circuit based on the display driving operation by the first driving circuit. A fingerprint sensing operation is performed on the display panel according to the timing control signal by the second driving circuit, wherein the fingerprint sensing operation is performed with the same frame polarity configuration rule. The fingerprint sensing operation includes a sensor reset operation and an image capture operation. The frame polarity configuration of the display panel when performing the sensor reset operation on a same fingerprint sensing area is referred to as a first polarity configuration. The frame polarity configuration of the display panel when performing the image capture operation on the same fingerprint sensing area is referred to as a second polarity configuration. The operation of "perform a fingerprint sensing operation on the display panel with a same frame polarity configuration rule" includes fixing a relation between the first polarity configuration and the second polarity configuration whenever the fingerprint sensing operation is performed.

In an embodiment of the disclosure, the driving device is configured to drive a display panel. The driving device includes a first driving circuit and a second driving circuit. The first driving circuit is configured to perform a display driving operation on the display panel, wherein the first driving circuit controls the display panel to perform polarity inversion between multiple frame polarity configurations when multiple display frames are displayed continuously, and the first driving circuit outputs a timing control signal. The second driving circuit is coupled to the first driving circuit to receive the timing control signal. The second driving circuit is configured to perform a first fingerprint sensing area sensing operation and a second fingerprint sensing area sensing operation on the display panel according to the timing control signal to respectively obtain a first fingerprint sensing area and a second fingerprint sensing area. The frame polarity configuration of the display panel when the first fingerprint frame sensing operation is performed is different from the frame polarity configuration of the display panel when the second fingerprint frame sensing operation is performed.

In an embodiment of the disclosure, the operation method includes the following steps. A display driving operation is performed on a display panel by a first driving circuit, wherein the first driving circuit controls the display panel to perform polarity inversion between multiple frame polarity configurations when multiple display frames are displayed continuously. A timing control signal is output to a second driving circuit based on the display driving operation by the first driving circuit. A first fingerprint frame sensing operation and a second fingerprint frame sensing operation are performed on the display panel according to the timing control signal by the second driving circuit to respectively obtain a first fingerprint frame and a second fingerprint frame. The frame polarity configuration of the display panel when the first fingerprint frame sensing operation is performed is different from the frame polarity configuration of the display panel when the second fingerprint frame sensing operation is performed.

Based on the above, the driving device and the operation method thereof according to the embodiments of the disclosure may perform the fingerprint sensing operation (sensor reset operation and image capture operation) on the display panel having the fingerprint sensing function with the same frame polarity configuration rule. In this way, the quality of a fingerprint image can be improved as much as possible.

To make the aforementioned and other features of the disclosure more comprehensible, several embodiments accompanied with drawings are described in detail as follows.

BRIEF DESCRIPTION OF THE DRAWINGS

FIG. 4A and FIG. 4B are schematic diagrams of two adjacent display frames performed with column inversion according to an embodiment of the disclosure.

FIG. 5A and FIG. 5B are schematic diagrams of two adjacent display frames performed with dot inversion according to another embodiment of the disclosure.

DETAILED DESCRIPTION OF DISCLOSED EMBODIMENTS

Figure 1:
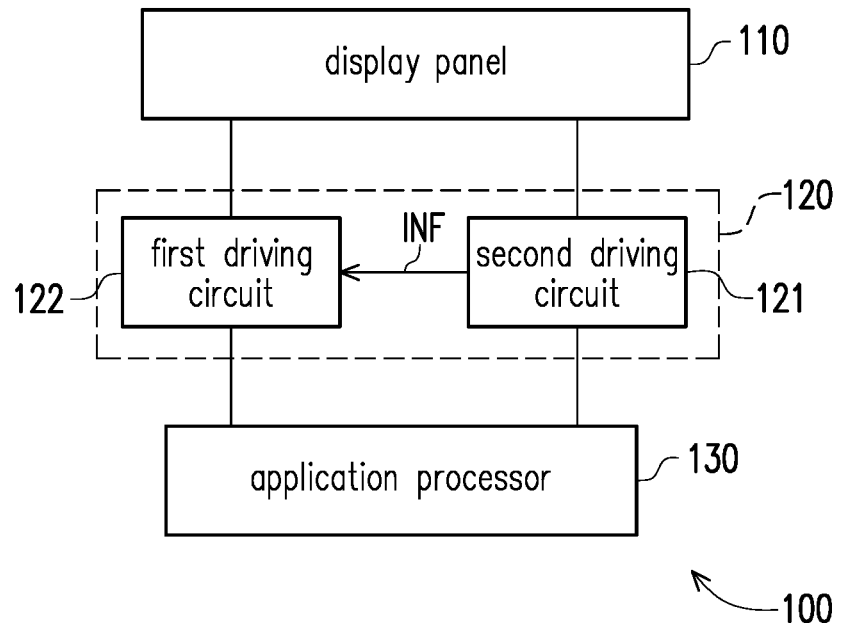
FIG. 1 is a circuit block diagram of a display device according to an embodiment of the disclosure.

The term "coupling (or connection)" used in the entire specification (including the claims) of the present application may refer to any direct or indirect connection means. For example, if a first device is described as being coupled (or connected) to a second device, it should be interpreted that the first device may be directly connected to the second device or the first device may be indirectly connected to the second device through other devices or certain connection means. Terms such as "first", "second", etc. mentioned in the entire specification (including the claims) of the present application are used to name the elements or to distinguish between different embodiments or ranges, but not to limit the upper limit or lower limit of the number of elements. In addition, wherever possible, elements/components/steps using the same reference numeral in the drawings and embodiments represent the same or similar parts. Relevant descriptions in different embodiments may be made with reference to each other for elements/components/steps using the same reference numeral or using the same terminology.

FIG. 1 is a circuit block diagram of a display device 100 according to an embodiment of the disclosure. The display device 100 shown in FIG. 1 includes a display panel 110, a driving device 120, and an application processor 130. In some application examples, the application processor 130 may be a core control processor in a handheld computer device or a mobile phone. The display panel 110 may be any panel having a fingerprint sensing function. The embodiment does not limit the specific structure of the display panel 110. For example, in some embodiments, the display panel 110 may be a display panel having an in-display fingerprint sensing function. That is, the display panel 110 may have a display pixel array (for providing a display function) and a fingerprint sensor array (for providing a fingerprint sensing function). In other embodiments, the display panel 110 may be a touch display panel having the in-display fingerprint sensing function. That is, the display panel 110 has a display pixel array, an in-display touch sensor array (for providing a touch sensing function), and an in-display fingerprint sensor array.

A display scan driving circuit for driving a display pixel array is also referred to as a gate in panel (GIP) or a gate on array (GOA). A fingerprint scan driving circuit for driving a fingerprint sensor array is also referred to as a fingerprint GIP or a fingerprint GOA. In some embodiments, the display scan driving circuit and the fingerprint scan driving circuit may be arranged in the display panel 110.

The application processor 130 may control the driving device 120, such that the driving device 120 drives the display panel 110. The driving device 120 is coupled to the display panel 110. The driving device 120 may provide a control clock (such as the control clocks for generating scan driving signals) to the display scan driving circuit configured in the display panel 110, such that the display scan driving circuit provides data voltage to drive the display pixel array of the display panel 110 to display a image frame on the display panel 110. The driving device 120 may also provide different voltages (touch driving signals) to the in-display touch sensor array configured in the display panel 110 to detect a touch event of the display panel 110. The driving device 120 may also provide a control clock to the fingerprint scan driving circuit configured on the display panel 110, such that the fingerprint scan driving circuit produces a fingerprint scan driving signal to drive the in-display fingerprint sensor array of the display panel 110 to read/sense a fingerprint image.

In the embodiment shown in FIG. 1, the driving device 120 includes a first driving circuit 121 and a second driving circuit 122. The first driving circuit 121 and the second driving circuit 122 may be integrated in the same semiconductor chip. Alternatively, the first driving circuit 121 and the second driving circuit 122 may be two independent semiconductor chips configured in a chip-on-glass (COG) package, a chip-on-film (COF) package, a chip-on-plastic (COP) package, or a chip-on-board (COB) package.

The first driving circuit 121 may communicate with the application processor 130 via a mobile industry processor interface (MIPI) for displaying relevant information and an inter-integrated circuit (I²C) interface for touching relevant information. The application processor 130 may send data/commands/control signals relevant to display to the first driving circuit 121 based on an MIPI protocol and send data/commands/control signals relevant to touch to the first driving circuit 121 based on an I²C protocol. The first driving circuit 121 may perform a display driving operation and a touch sensing operation on the display panel 110 based on the control of the application processor 130. In some embodiments, the first driving circuit 121 may be a touch with display driver integration (TDDI) circuit.

The second driving circuit 122 may communicate with the application processor 130 via serial-to-parallel interfaces (SPI). The application processor 130 may send data/commands/control signals relevant to fingerprint sensing to the first driving circuit 121 based on an SPI protocol. The second driving circuit 122 may perform a fingerprint sensing operation on the display panel 110 based on the control of the application processor 130. The application processor 130 may receive a sensing result of the fingerprint sensing operation from the second driving circuit 122, thereby obtaining a fingerprint image and being able to perform fingerprint recognition.

The embodiment does not limit the implementation details of the display driving operation, the touch sensing operation, and the fingerprint sensing operation. For example, according to design requirements, the display driving operation may be a conventional display driving operation or other driving operations, the touch sensing operation may be a conventional touch sensing operation and is not limited to self-capacitive or mutual capacitive sensing, and the fingerprint sensing operation may be a conventional fingerprint sensing operation or other sensing operations. Generally speaking, the driving operation (such as operation of the display driving function and/or the touch sensing function) may affect/interfere with the fingerprint sensing operation.

Figure 2:
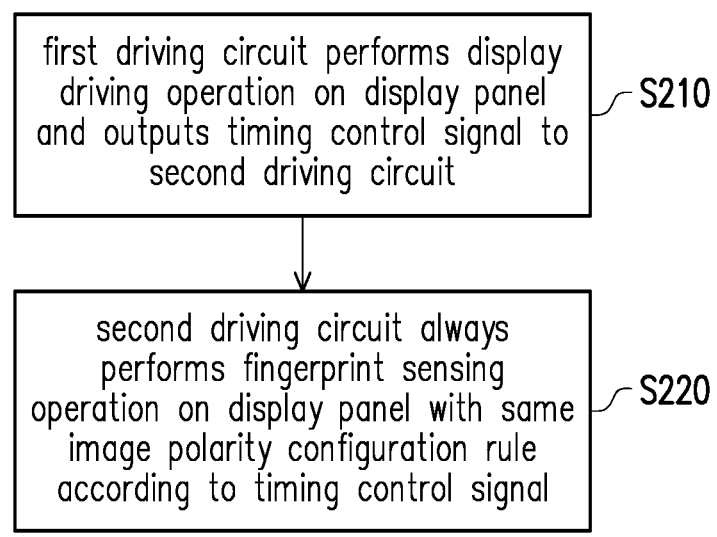
FIG. 2 is a flowchart of an operation method of a driving device according to an embodiment of the disclosure.

FIG. 2 is a flowchart of an operation method of a driving device 120 according to an embodiment of the disclosure. Please refer to FIG. 1 and FIG. 2. In Step S210, the first driving circuit 121 may perform the display driving operation and/or the touch sensing operation on the display panel 110. The display panel 110 performs polarity inversion between multiple frame polarity configurations based on the display driving operation of the first driving circuit 121. The first driving circuit 121 may also output a timing control signal INF corresponding to the display driving operation to the second driving circuit 122. The second driving circuit 122 is coupled to the first driving circuit 121 to receive the timing control signal INF. In Step S220, the second driving circuit 122 may perform the fingerprint sensing operation on the display panel 110 according to the timing control signal INF, and the fingerprint sensing operation is performed with a same frame polarity configuration rule. The fingerprint sensing operation includes a sensor reset operation and an image capture operation. The reset operation and the image capture operation performed on the fingerprint sensor array are performed row by row. For the same fingerprint sensor row, the time segment between the completion of the sensor reset operation SR for the fingerprint sensor row and the start of the image capture operation IC for the fingerprint sensor row is the exposure period of the fingerprint sensor row.

For convenience of description, the term "fingerprint sensing area" below refers to the area where fingerprint image data is to be obtained, and is not limited to corresponding to a complete fingerprint or part of the fingerprint; the term "fingerprint frame" refers to the fingerprint sensing data obtained by the second driving circuit 122 performing a complete fingerprint sensing operation on a fingerprint sensing area in the fingerprint sensor array, which is digital data obtained by converting the analog sensing signal, and is not limited to corresponding to a complete fingerprint or part of a fingerprint. the frame polarity configuration of the display panel 110 may be referred to as a first polarity configuration when performing the sensor reset operation on a same fingerprint sensing area and the frame polarity configuration of the display panel 110 may be referred to as a second polarity configuration when performing the image capture operation on the same fingerprint sensing area. The operation of "perform the fingerprint sensing operation on the display panel with the same image frame polarity configuration rule" includes fixing a relation between the first polarity configuration and the second polarity configuration whenever the fingerprint sensing operation is performed.

Figure 3:
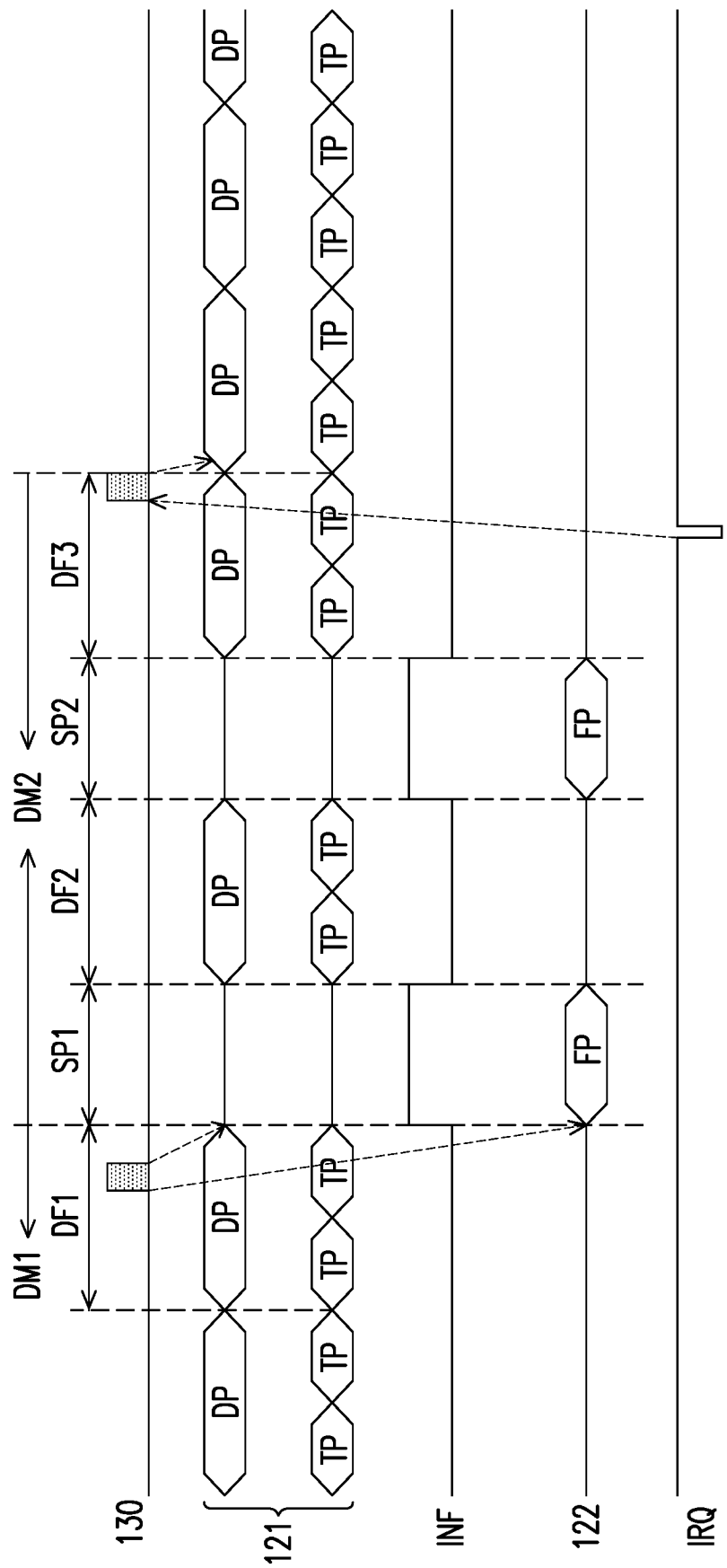
FIG. 3 is a timing diagram illustrating multiple frame periods operating under the method of FIG. 2 according to an embodiment of the disclosure.

FIG. 3 is a timing diagram illustrating multiple frame periods operating under the method of FIG. 2 according to an embodiment of the disclosure. The horizontal axis shown in FIG. 3 represents time. Some of the multiple frame periods shown in FIG. 3 are labeled as DF1, SP1, DF2, SP2, and DF3. In the embodiment shown in FIG. 3, the driving device 120 is in a first driving mode DM1 in the frame period DF1 and a previous frame period. For example, the first driving circuit 121 in the first driving mode DM1 may perform both the display driving operation (represented by "DP") and the touch sensing operation (represented by "TP") when the display panel 110 keeps refreshing a display content. Alternatively, for example, the first driving circuit 121 in the first driving mode DM1 may perform the touch sensing operation TP and also stop performing the display driving operation DP when the display panel 110 enters an idle state and stops refreshing the display content.

In the embodiment shown in FIG. 3, the driving device 120 is in a second driving mode DM2 in the frame periods SP1, DF2, SP2, and DF3. The first driving circuit 121 in the second driving mode DM2 may suspend performing the display driving operation DP and the touch sensing operation TP or suspend performing the display driving operation DP and keep performing the touch sensing operation TP. A touch sensing frequency (touch frame rate) and/or a display frequency (display frame rate) in the second driving mode DM2 may be the same (or lower than) as the touch sensing frequency (touch frame rate) and/or the display frequency (display frame rate) in the first driving mode DM1.

In some embodiments, the second driving mode DM2 may be a frame skip mode. The first driving circuit 121 is configured to periodically perform an operating cycle in the frame skip mode (second driving mode DM2). The operating cycle includes an active period composed of N consecutive frame periods and a skip period composed of M consecutive frame periods, wherein N or M is an integer equal to or greater than 1. For example, N=1 and M=1 or N=1 and M=2, or N=2 and M=1. In the active period, the first driving circuit 121 performs at least the touch sensing operation TP; and in the skip period, the first driving circuit 121 suspends performing (or referred to as skipping) at least one of the display driving operation DP and the touch sensing operation TP. When entering the frame skip mode, the active period first appears and followed by the skip period; or the skip period first appears and followed by the active period. The length of each frame period in the active period is not limited to being of the same (or different) length of each frame period in the skip period. In the example shown in FIG. 3, the frame skip mode performs two operating cycles, M=1 and N=1. Frame periods SP1 and DF2 are in a first operating cycle and frame periods SP2 and DF3 are in a second operating cycle. The frame periods SP1 and SP2 are skip periods and the frame periods DF2 and DF3 are active periods.

In other embodiments, the second driving mode DM2 may be a porch mode. The first driving circuit 121 is configured to periodically perform the operating cycle equal to the frame period in the porch mode. In the porch mode, the first driving circuit 121 is configured to suspend performing at least one of the display driving operation DP and the touch sensing operation TP in a porch interval of each frame period. The porch interval may be a front porch interval between an end of a last data (which may be display data or touch sensing data) of a previous frame and a frame synchronization (Vsync) of a current frame. The porch interval may be a back porch interval between the frame synchronization (Vsync) of the current frame and a start of a first data (which may be display data or touch sensing data) of the current frame. The porch interval may be regarded as a skip period and the length of the porch interval may be configured by a core control processor (i.e. application processor 130) of the display device 100. For the display quality of the display panel 110, the length of the porch interval (as skip period) configured by the application processor 130 is acceptable as the display quality will be reduced if the skip period is too long. For example, in the case where the at least acceptable display frame rate is about 30 Hz, the length of the porch interval may be 1 ms to 33 ms. A sensing result may be obtained based on fingerprint sensing operation requirements to produce a sufficiently good time length of a fingerprint image to consider the length of the skip period. In the solution where the display driving operation and the touch sensing operation are performed in a time-divisional manner, the display interval and the touch sensing interval are active periods.

Please refer to FIG. 1, FIG. 2, and FIG. 3. The first driving circuit 121 performs the first driving mode DM1 in multiple frame periods. After the frame periods under the first driving mode DM1 end, the first driving circuit 121 performs the second driving mode DM2. The application processor 130 sends a command or a control signal in the frame period DF1 to wake up the second driving circuit 122 to perform the fingerprint sensing operation FP and sends another command or control signal to notify the first driving circuit 121. In response to the command received from the application processor 130, the first driving circuit 121 performs the second driving mode DM2 and outputs the timing control signal INF associated with the fingerprint sensing operation FP to the second driving circuit 122 (Step S210). Under the second driving mode DM2, the first driving circuit 121 suspends performing at least one of the display driving operation DP and the touch sensing operation TP in the skip period. The second driving circuit 122 performs the fingerprint sensing operation FP according to the timing control signal INF in the skip period (Step S220). The fingerprint sensing operation FP in the skip period may be at least one of the sensor reset operation (for resetting a fingerprint sensor array column by column) and the image capture operation (for reading a fingerprint sensing result from the fingerprint sensor array column by column). In the period of the fingerprint sensing operation FP, the second driving circuit 122 may obtain a sensing result of one or more fingerprint images to be sent to the application processor 130 or may additionally produce a final fingerprint image to be sent to the application processor 130. After the sensing operation is completed, the second driving circuit 122 may return to an idle (inactive/standby) state and send an interrupt IRQ to the application processor 130. In response to the interrupt IRQ received indicating that the fingerprint sensing operation has been completed, the application processor 130 may send another command to the first driving circuit 121 to control the first driving circuit 121 to return to the same state as before the second driving mode DM2 started, that is, return to the driving mode DM1, but is not limited to the embodiment.

FIG. 3 shows an example where the first driving circuit 121 operates with the first driving mode DM1 in the frame period DF1 and the previous frame period, wherein the first driving mode DM1 performs the display driving operation DP and the touch sensing operation TP. The first driving circuit 121 suspends performing the display driving operation DP and the touch sensing operation TP in the frame periods SP1 and SP2 (as skip periods), and the second driving circuit 122 performs the fingerprint sensing operation FP in the frame periods SP1 and SP2. In the frame periods DF2 and DF3 as the active periods, the first driving circuit 121 performs the display driving operation DP and the touch sensing operation TP. The timing control signal INF produced by the first driving circuit 121 may indicate when at least one of the display driving operation DP and the touch sensing operation TP is to be discontinued in the second driving mode DM2 and the time length to be discontinued for. On the other hand, since the fingerprint sensor is embedded in the display panel and the fingerprint sensing operation is performed at a different time from the display driving operation or the touch sensing operation, a first timing control signal INF is a signal associated with the fingerprint sensing operation. As in the embodiment shown in FIG. 3, the first timing control signal INF having a logic high level may indicate that both the display driving operation DP and the touch sensing operation TP are suspended, and the fingerprint sensing operation FP is activated or enabled while the display driving operation DP and the touch sensing operation TP are suspended. The timing control signal INF having a logic low level may indicate that both the display driving operation DP and the touch sensing operation TP are enabled, and the fingerprint sensing operation FP is disabled (invalid or standby) while the display driving operation DP and the touch sensing operation TP are enabled.

The frame polarity configuration of the display panel 110 includes a positive polarity configuration and a negative polarity configuration. In some embodiments, the first driving circuit 121 may use a polarity inversion technique to drive the panel 110 to display an image frame. In general, the mode of frame polarity inversion includes dot inversion, column inversion, or other inversion modes. Regardless of the mode of frame polarity inversion, each pixel of the display panel 110 needs to switch polarity from displaying a current frame to displaying a next frame, which means that polarity of each pixel is switched between positive polarity (generally labeled as "+") and negative polarity (generally labeled as "−"). In this way, the frame polarity configuration of a frame (hereinafter referred to as frame polarity) will also be switched.

Figures 4A, 4B:
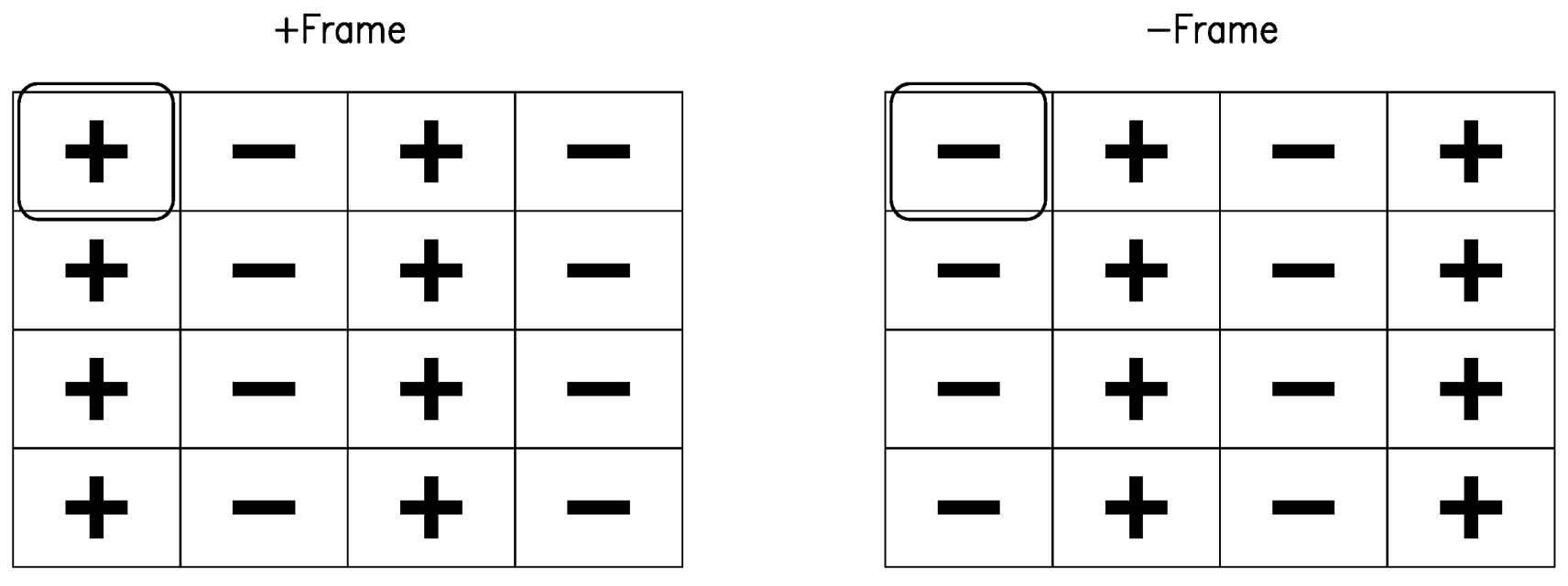

FIG. 4A and FIG. 4B are schematic diagrams of two adjacent display frames performed with column inversion according to an embodiment of the disclosure. In the example shown in FIG. 4A and FIG. 4B, a display frame has 4×4 pixels (or subpixels). Please refer to FIG. 4A and FIG. 4B, which show the column inversion mode. For convenience of description, the frame polarity configuration of the display frame shown in FIG. 4A is referred to as a positive polarity configuration+Frame and the frame polarity configuration of the display frame shown in FIG. 4B is referred to as a negative polarity configuration −Frame. A polarity sequence (polarity configuration) of a pixel column of the positive polarity configuration+Frame from left to right may be "+ −+ − . . . " and a polarity sequence (polarity configuration) of a pixel column of the negative polarity configuration−Frame from left to right is "− +− + . . . ". As shown in FIG. 4A and FIG. 4B, frame polarity may be defined according to polarity of a pixel at a fixed position (for example, polarity of the leftmost pixel in the uppermost pixel column of the display pixel array).

Figures 5A, 5B:
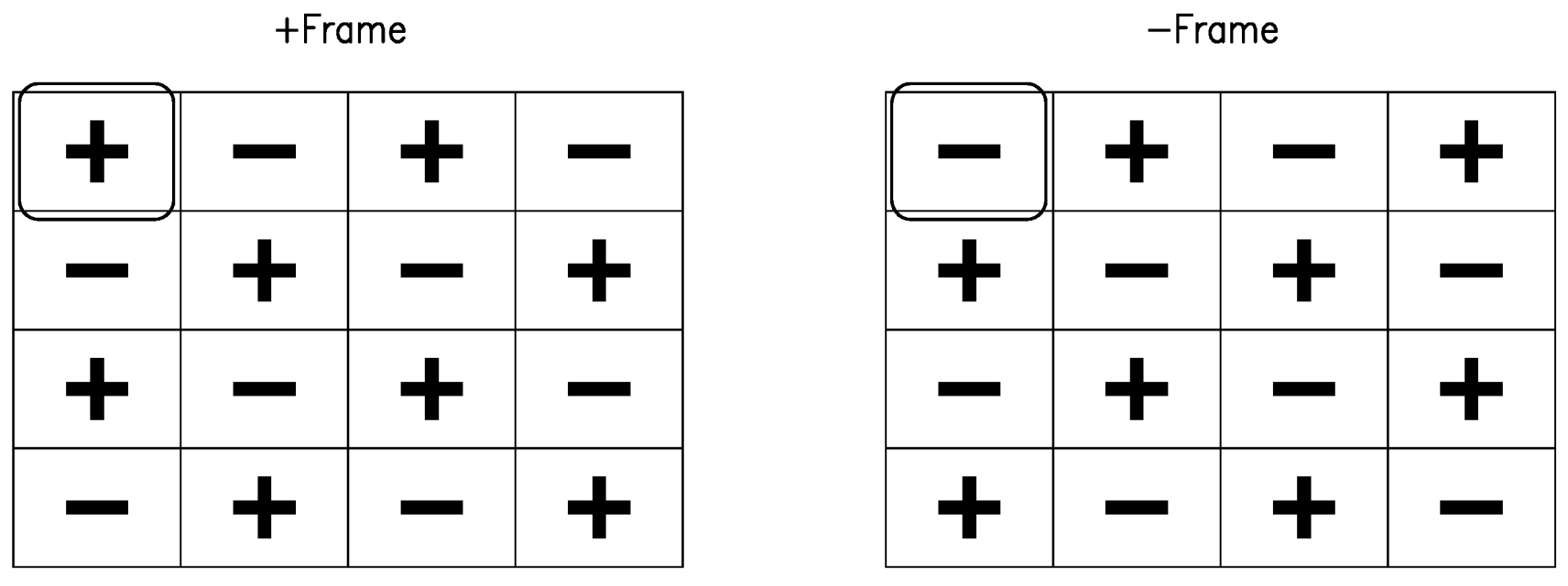

FIG. 5A and FIG. 5B are schematic diagrams of two adjacent display frames performed with dot inversion according to another embodiment of the disclosure. In the embodiment shown in FIG. 5A and FIG. 5B, a display frame has 4×4 pixels (or subpixels). For convenience of description, the frame polarity configuration of the display frame shown in FIG. 5A is referred to as a positive polarity configuration, +Frame, and the frame polarity configuration of the display frame shown in FIG. 5B is referred to as a negative polarity configuration, −Frame.

Figure 6:
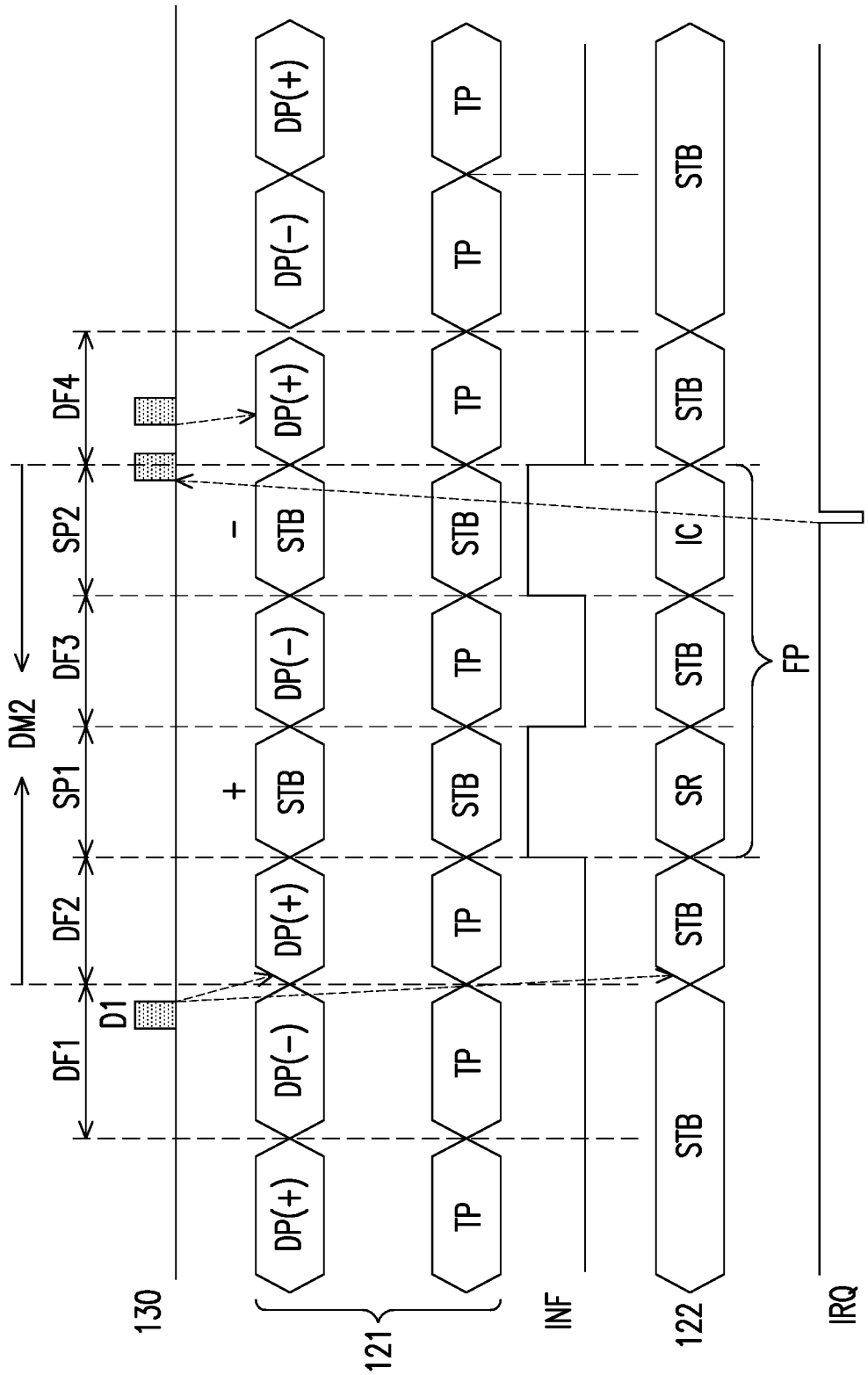
FIG. 6 and FIG. 7 are timing diagrams of multiple frame periods according to yet another embodiment of the disclosure.
Figure 7:
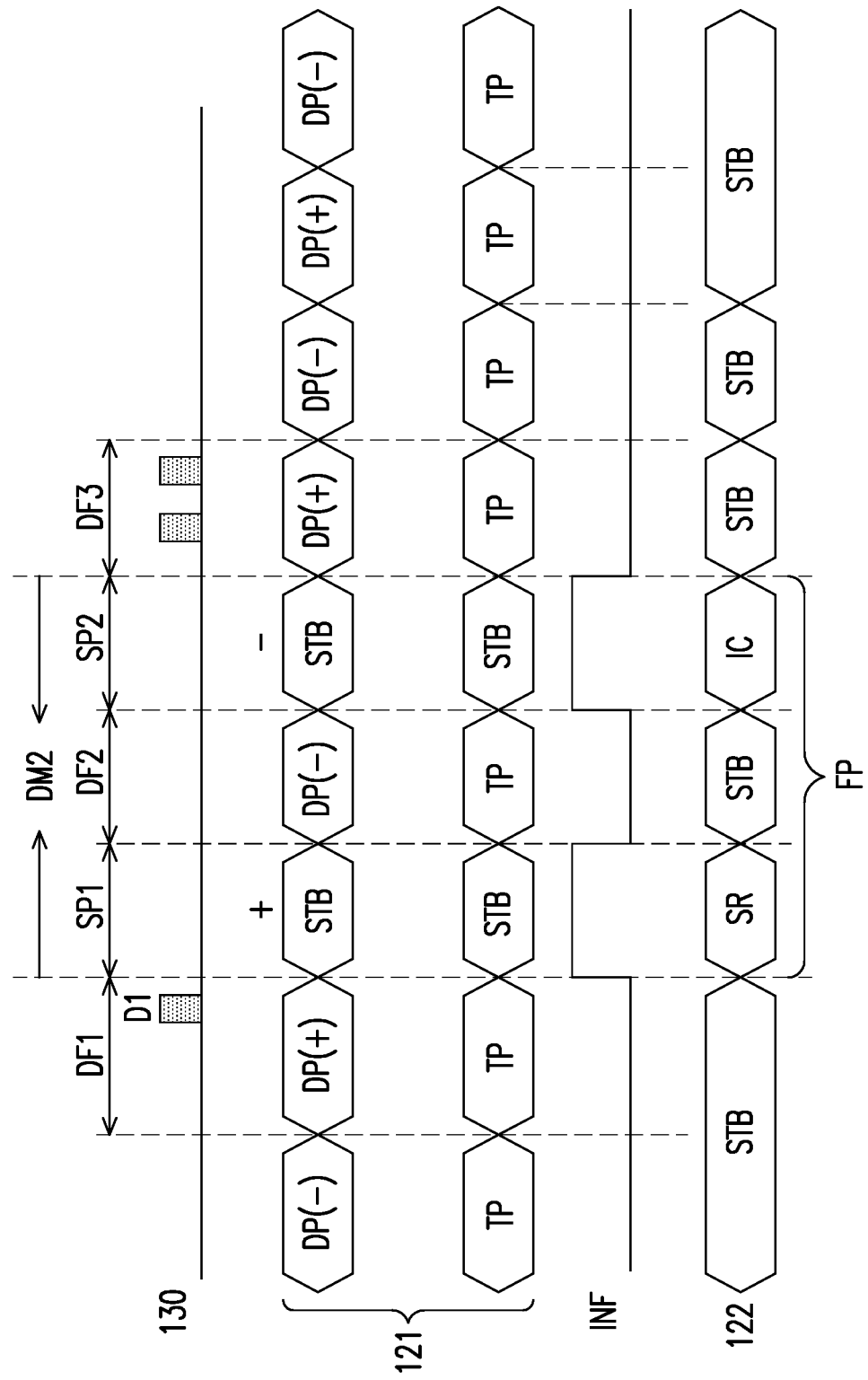

FIG. 6 and FIG. 7 are timing diagrams of multiple frame periods according to yet another embodiment of the disclosure. The horizontal axes shown in FIG. 6 and FIG. 7 represent time. Some of the multiple frame periods shown in FIG. 6 are labeled as DF1, DF2, SP1, DF3, SP2, and DF4, wherein the sensor reset operation SR on a same fingerprint sensing area is performed in a skip period (for example, frame period SP1) between the display frame period DF2 and the display frame period DF3, and the image capture operation IC on the same fingerprint sensing area is performed in another skip period (for example, frame period SP2) between the display frame period DF3 and the display frame period DF4. Some of the multiple frame periods shown in FIG. 7 are labeled as DF1, SP1, DF2, SP2, and DF3, wherein the sensor reset operation SR on a same fingerprint sensing area is performed in a skip period (for example, frame period SP1) between the display frame period DF1 and the display frame period DF2, and the image capture operation IC on the same fingerprint sensing area is performed in another skip period (for example, frame period SP2) between the display frame period DF2 and the display frame period DF3.

"STB" shown in FIG. 6 and FIG. 7 represents standby. In the example of FIG. 6, the operating cycle of the second driving mode DM2 (frame skip mode) includes an active period composed of one frame period and a skip period composed of one frame period. For detailed operations, please refer to the relevant descriptions in FIG. 1 to FIG. 3. The fingerprint sensing operation FP includes a sensor reset operation (represented by "SR") and an image capture operation (represented by "IC"). The second driving circuit 122 may perform the sensor reset operation SR in the frame period SP1 to reset the fingerprint sensor array of the display panel 110. The second driving circuit 122 may perform the image capture operation IC in the frame period SP2 to read the fingerprint sensing result from the fingerprint sensor array of the display panel 110. A time segment between the completion of the sensor reset operation SR and the start of the image capture operation IC is an exposure period of a fingerprint frame. For the same fingerprint sensor row, the time segment between the completion of the sensor reset operation SR for the fingerprint sensor row and the start of the image capture operation IC for the fingerprint sensor row is the exposure period of the fingerprint sensor row.

In the example shown in FIG. 6 and FIG. 7, it is assumed that the preconfigured frame polarity configuration rule is that a first polarity configuration is a positive polarity configuration+Frame and a second polarity configuration is a negative polarity configuration −Frame, which means that the sensor reset operation SR must be performed when the frame polarity configuration of the display panel is in the positive polarity configuration, and the image capture operation IC must be performed when the frame polarity configuration of the display panel is in the negative polarity configuration.

When the first driving circuit 121 does not output the data voltage of the display frame to the display panel during the next display frame, the polarity of the liquid crystal molecules of the display panel will remain the same as the current display frame. According to this principle, the frame polarity configuration of the display panel during the frame period for fingerprint sensing operation (i.e., the skip period) is determined by the display frame right before the fingerprint sensing operation starts. The first driving circuit 121 can determine the frame polarity configuration during the skip period according to the timing of the known second driving mode DM2. When the application processor 130 sends a fingerprint sensing request D1, the first driving circuit 121 may check the frame polarity configuration of the current display frame. When the frame polarity configuration of the current display frame meets the frame polarity configuration rule of the fingerprint sensing operation, the first driving circuit 121 notifies the second driving circuit 122 with the timing control signal INF, such that the second driving circuit 122 performs the fingerprint sensing operation FP on the display panel 110 with the frame polarity configuration rule in the next frame period after the current display frame ends, and the first driving circuit 121 can suspend the display driving operation during the next frame period. When the first driving circuit 121 checks that the frame polarity configuration of the current display frame does not meet the frame polarity configuration rule of the fingerprint sensing operation, the first driving circuit 121 continues to perform the display driving operation DP after the current display frame ends, such that after the display panel 110 finishes displaying the next display frame, the display panel 110 can meet the frame polarity configuration rule of the fingerprint sensing operation during one or more frame periods of the skip period. The first driving circuit 121 notifies the second driving circuit 122 with the timing control signal INF, such that the second driving circuit 122 performs the fingerprint sensing operation FP on the display panel 110 with the frame polarity configuration rule in another frame period after the next display frame ends. Therefore, the second driving circuit 122 may perform the fingerprint sensing operation FP on the display panel 110 according to the timing control signal INF, and the fingerprint sensing operation FP is performed with the same frame polarity configuration rule.

Taking the scenario shown in FIG. 6 as an example, when the frame period DF1 receives the fingerprint sensing request D1, the first driving circuit 121 checks and determines that the frame polarity configuration of the display panel 110 in the frame period DF1 is the negative polarity configuration −Frame (labeled as "DP(−)" in FIG. 6), if the skip period is entered right after the frame period DF1 ends, the frame polarity configuration does not meet the preconfigured frame polarity configuration rule required for the fingerprint sensing operation. Therefore, in the frame period DF2 immediately after the frame period DF1, the first driving circuit 121 performs the display driving operation DP on the display panel 110 with the positive polarity configuration+Frame (labeled as "DP(+)" in FIG. 6). In the frame period SP1 immediately after the frame period DF2, the second driving circuit 122 performs the sensor reset operation SR of the fingerprint sensing operation FP. Since the first driving circuit 121 performs the display driving operation DP on the display panel 110 with the positive polarity configuration+Frame in the frame period DF2, the frame polarity configuration of the display panel 110 in the frame period SP1 is still the positive polarity configuration+Frame (labeled as "+" in FIG. 6).

In the frame period DF3 immediately after the frame period SP1, the first driving circuit 121 performs the display driving operation DP on the display panel 110 with the negative polarity configuration−Frame (labeled as "DP(−)" in FIG. 6). In the frame period SP2 immediately after the frame period DF3, the second driving circuit 122 performs the image capture operation IC of the fingerprint sensing operation FP. Since the first driving circuit 121 enter the skip period immediately after performing the display driving operation DP on the display panel 110 with the negative polarity configuration−Frame in the frame period DF3, the frame polarity configuration of the display panel 110 in the frame period SP2 is still the negative polarity configuration−Frame (labeled as "−" in FIG. 6). After the second driving circuit 122 completes the image capture operation IC, the second driving circuit 122 sends the interrupt IRQ to the application processor 130, such that the application processor 130 sends another command to the first driving circuit 121. The first driving circuit 121 may return to a state the same as the state before the start of the second driving mode DM2 based on the control of the application processor 130 in the frame period DF4.

In another scenario, please refer to FIG. 7. When the first driving circuit 121 receives the fingerprint sensing request D1 in the frame period DF1, the first driving circuit 121 may check and determine that the frame polarity configuration of the display panel 110 in the frame period DF1 is the positive polarity configuration+Frame (labeled as "DP(+)" in FIG. 7), which meets the preconfigured frame polarity configuration rule. Therefore, when the application processor 130 sends the fingerprint sensing request D1, the second driving circuit 122 may perform the fingerprint sensing operation FP on the display panel 110 with the pre-configured frame polarity configuration rule in the next frame period SP1 after the current display frame DF1 corresponding to the fingerprint display request D1 ends.

That is, in the frame period SP1 immediately after the frame period DF1, the second driving circuit 122 immediately starts to perform the sensor reset operation SR of the fingerprint sensing operation FP. Since the first driving circuit 121 performs the display driving operation DP on the display panel 110 with the positive polarity configuration+Frame in the frame period DF1, the frame polarity configuration of the display panel 110 in the frame period SP1 is still the positive polarity configuration+Frame (labeled as "+" in FIG. 7). In the frame period DF2 immediately after the frame period SP1, the first driving circuit 121 performs the display driving operation DP on the display panel 110 with the negative polarity configuration−Frame (labeled as "DP (−)" in FIG. 7). In the frame period SP2 immediately after the frame period DF2, the second driving circuit 122 performs the image capture operation IC of the fingerprint sensing operation FP. Since the first driving circuit 121 enter the skip period immediately after performing the display driving operation DP on the display panel 110 with the negative polarity configuration−Frame in the frame period DF2, the frame polarity configuration of the display panel 110 in the frame period SP2 is still the negative polarity configuration−Frame (labeled as "−" in FIG. 7). After the second driving circuit 122 completes the image capture operation IC, the second driving circuit 122 sends the interrupt IRQ to the application processor 130, such that the application processor 130 sends another command to the first driving circuit 121. The first driving circuit 121 may return to a state the same as the state before the start of the second driving mode DM2 based on the control of the application processor 130 in the frame period DF3.

Therefore, when performing the sensor reset operation FP on the same fingerprint sensing area, the first polarity configuration (i.e., frame polarity configuration of the display panel 110 when performing the sensor reset operation SR) is the positive polarity configuration+Frame and the second polarity configuration (i.e., frame polarity configuration of the display panel 110 when performing the image capture operation IC) is the negative polarity configuration−Frame. The second driving circuit 122 may perform the fingerprint sensing operation FP on the display panel 110 according to the timing control signal INF, and the fingerprint sensing operation FP is performed with the same frame polarity configuration rule. That is, the second driving circuit 122 performs the sensor reset operation SR when the display panel 110 is in the positive polarity configuration+ Frame and performs the image capture operation IC when the display panel 110 is in the negative polarity configuration–Frame whenever the fingerprint sensing operation FP is performed on the display panel 110. In this way, the quality of a fingerprint image can be improved as much as possible.

Figure 8:
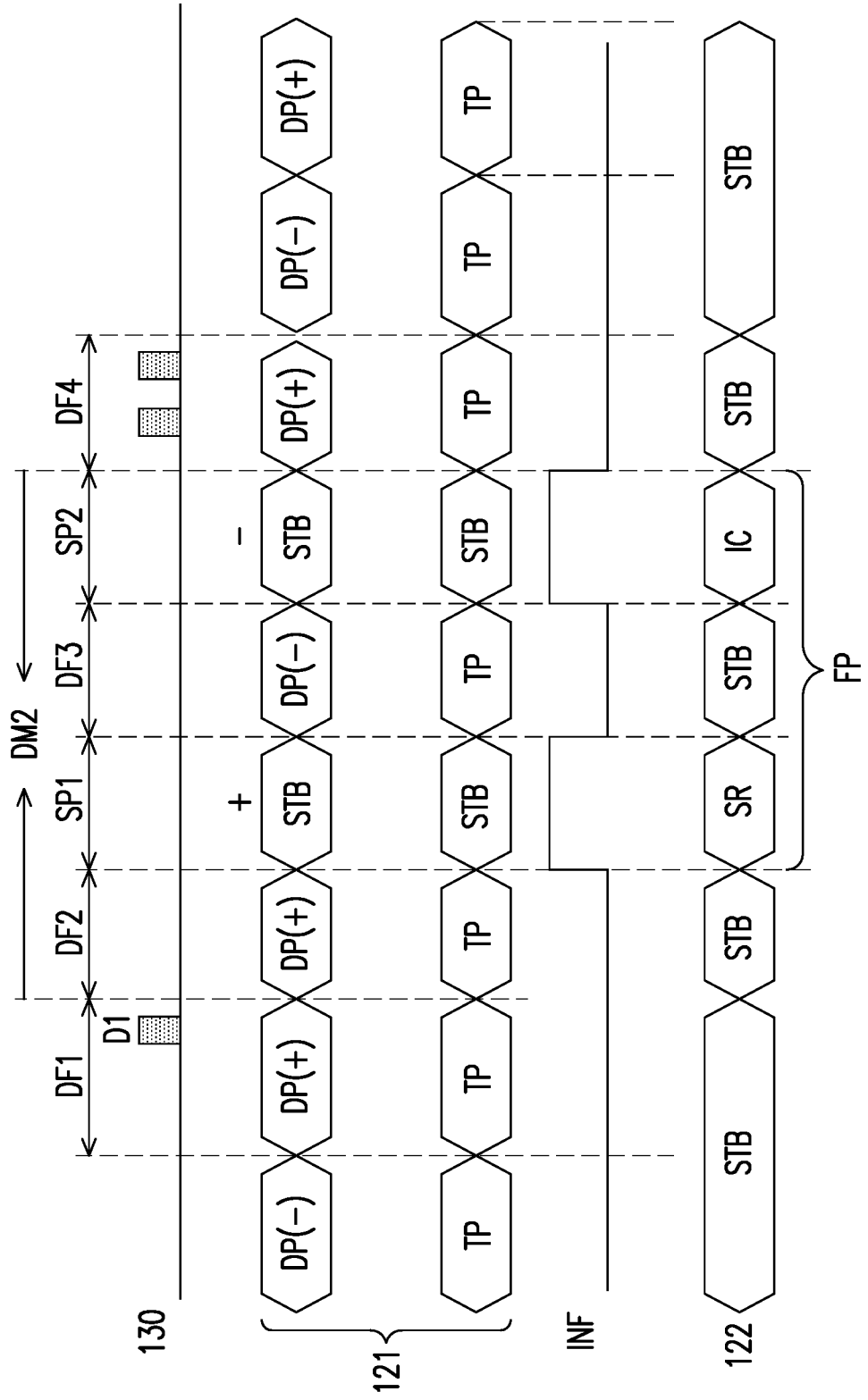
FIG. 8 is a timing diagram of multiple frame periods according to still another embodiment of the disclosure.

FIG. 8 is a timing diagram of multiple frame periods according to still another embodiment of the disclosure. The horizontal axis shown in FIG. 8 represents time. Some of the multiple frame periods shown in FIG. 8 are labeled as DF1, DF2, SP1, DF3, SP2, and DF4, wherein the sensor reset operation SR on a same fingerprint sensing area is performed in a skip period (for example, frame period SP1) between the display frame period DF2 and the display frame period DF3, and the image capture operation IC on the same fingerprint sensing area is performed in another skip period between the display frame period DF3 and the display frame period DF4 (for example, frame period SP2). Different from the operation method for generating the timing shown in FIG. 6 and FIG. 7, another operation method may result in the different timing shown in FIG. 8.

Please refer to FIG. 1 and FIG. 8. In the current frame period DF1 (in the first driving mode DM1), the first driving circuit 121 receives the fingerprint sensing request D1 (command to activate the fingerprint sensing operation FP) from the application processor 130. In response to the fingerprint sensing request D1 received, regardless of the current frame polarity configuration of the display panel 110, the first driving circuit 121 performs at least the display driving operation DP before the fingerprint sensing operation FP starts, such that another frame (frame of the frame period DF2, which is labeled as "DP(+)" in FIG. 8) may be displayed using the frame polarity configuration (for example, positive polarity configuration+Frame) meeting the preconfigured frame polarity configuration rule. For the frame periods SP1, DF3, SP2, and DF4 shown in FIG. 8, reference may be made to the relevant descriptions of the frame periods SP1, DF3, SP2, and DF4 shown in FIG. 6 or the relevant descriptions of the frame periods SP1, DF2, SP2, and DF3 shown in FIG. 7, so there will be no reiteration here.

Through the operation method shown in FIG. 8, the second driving circuit 122 may perform the sensor reset operation SR when the display panel 110 is in the positive polarity configuration+F and perform the image capture operation IC when the display panel 110 is in the negative polarity configuration–Frame. That is, the first polarity configuration is the positive polarity configuration+Frame and the second polarity configuration is the negative polarity configuration–Frame. Therefore, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

It should be noted that the embodiments shown in FIG. 6, FIG. 7, and FIG. 8 take "the first polarity configuration as the positive polarity configuration+Frame and the second polarity configuration as the negative polarity configuration–Frame" as illustrative examples, but the implementation manner is not limited thereto. For example, in other embodiments, the first polarity configuration (i.e., frame polarity configuration of the display panel 110 when performing the sensor reset operation SR) may be the negative polarity configuration–Frame and the second polarity configuration (i.e., frame polarity configuration of the display panel 110 when performing the image capture operation IC) may be the positive polarity configuration+Frame. In again some other embodiments, the first polarity configuration and the second polarity configuration may be the same negative polarity configuration–Frame. In yet some other embodiments, the first polarity configuration and the second polarity configuration may be the same positive polarity configuration+Frame.

Figure 9:
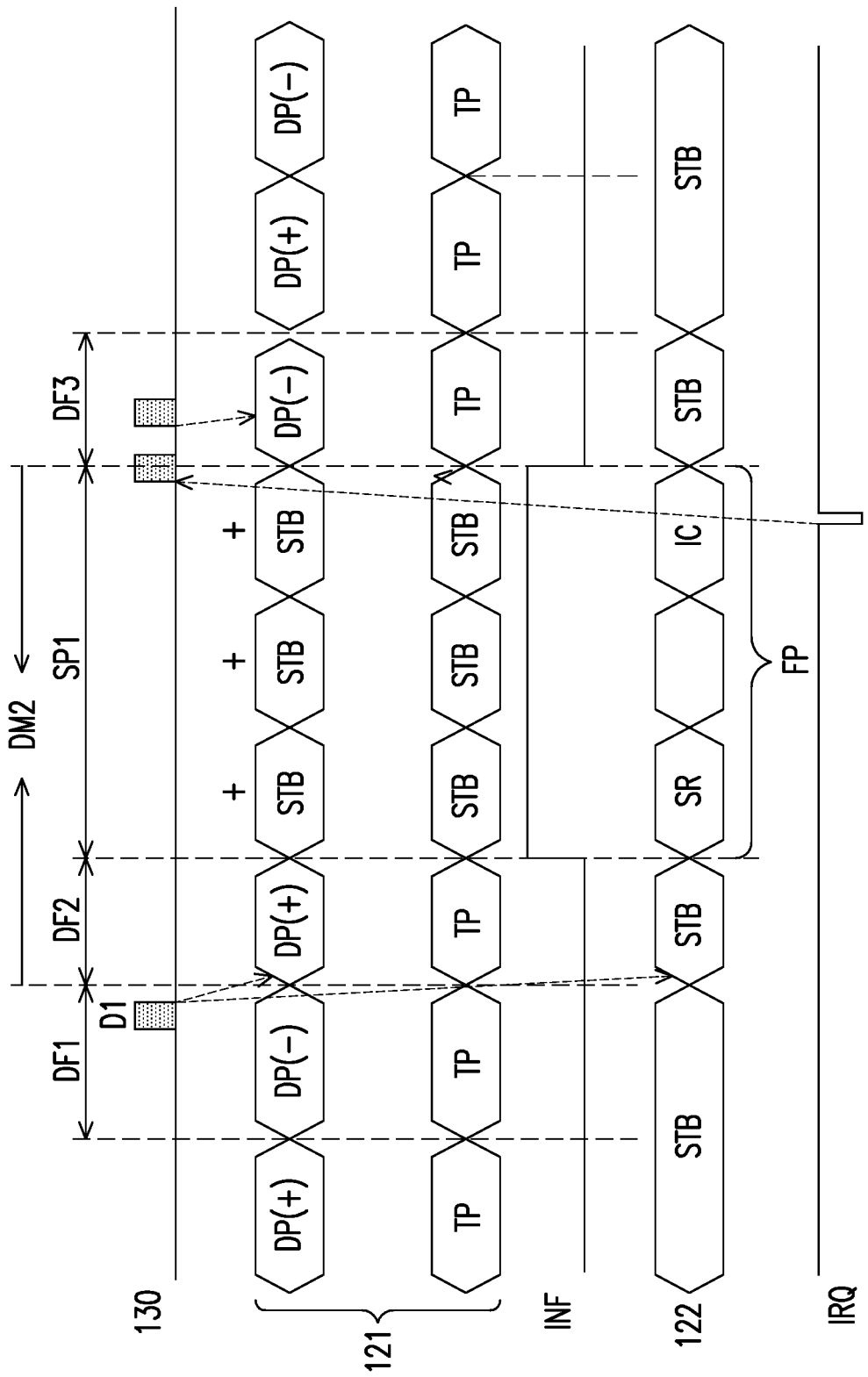
FIG. 9 and FIG. 10 are timing diagrams of multiple frame periods according to another embodiment of the disclosure.
Figure 10:
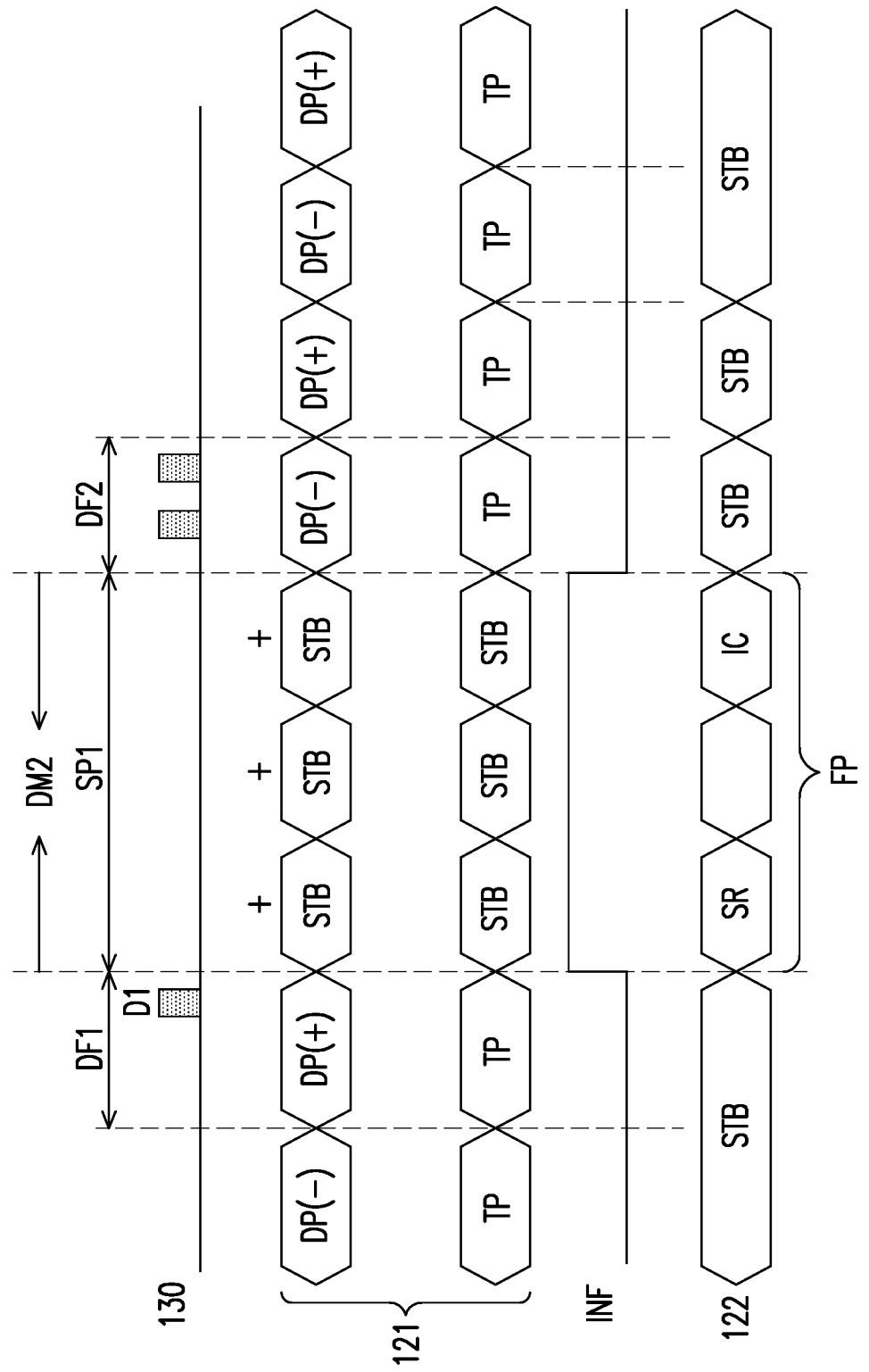

FIG. 9 and FIG. 10 are timing diagrams of multiple frame periods according to another embodiment of the disclosure. The horizontal axes shown in FIG. 9 and FIG. 10 represent time. Some of the multiple frame periods shown in FIG. 9 are labeled as DF1, DF2, SP1, and DF3, wherein the frame period SP1 (skip period) includes multiple display frame periods. Some of the multiple frame periods shown in FIG. 10 are labeled as DF1, SP1, and DF2, wherein the frame period SP1 (skip period) includes multiple display frame periods. "STB" shown in FIG. 9 and FIG. 10 represent standby. In the embodiment shown in FIG. 9 and FIG. 10, the first driving circuit 121 skips the display driving operation DP in the display frame periods of the frame period SP1. The sensor reset operation SR on a same fingerprint sensing area is performed in a display frame period in the frame period SP1 and the image capture operation IC on the same fingerprint sensing area is performed in another display frame period in the frame period SP1.

In the embodiment shown in FIG. 9 and FIG. 10, it is assumed that the preconfigured frame polarity configuration rule is that "each of the first polarity configuration and the second polarity configuration is the positive polarity configuration+Frame". When the application processor 130 sends the fingerprint sensing request D1, the first driving circuit 121 may check the frame polarity configuration of the current display frame.

Taking the scenario shown in FIG. 9 as an example, when the frame period DF1 receives the fingerprint sensing request D1, the first driving circuit 121 checks and determines that the frame polarity configuration of the display panel 110 in the frame period DF1 is the negative polarity configuration–Frame (labeled as "DP(–)" in FIG. 9), which does not meet the preconfigured frame polarity configuration rule. Therefore, in the frame period DF2 immediately after the frame period DF1, the first driving circuit 121 performs the display driving operation DP on the display panel 110 with the positive polarity configuration+Frame (labeled as "DP(+)" in FIG. 9). In the frame period SP1 (skip period) immediately after the frame period DF2, the second driving circuit 122 performs the sensor reset operation SR and the image capture operation IC of the fingerprint sensing operation FP in different display frame periods. Therefore, in the embodiment shown in FIG. 9, each of the first polarity configuration (i.e., frame polarity configuration of the display panel 110 when performing the sensor reset operation SR) and the second polarity configuration (i.e., frame polarity configuration of the display panel 110 when performing the image capture operation IC) is the positive polarity configuration+Frame.

In another scenario, please refer to FIG. 10. When the first driving circuit 121 receives the fingerprint sensing request D1 in the frame period DF1, the first driving circuit 121 may check and determine that the frame polarity configuration of the display panel 110 in the frame period DF1 is the positive polarity configuration+Frame (labeled as "DP(+)" in FIG.

7), which meets the preconfigured frame polarity configuration rule. Therefore, when the application processor 130 sends the fingerprint sensing request D1, the second driving circuit 122 may perform the fingerprint sensing operation FP on the display panel 110 with the preconfigured frame polarity configuration rule in the next frame period SP1 (skip period) after the current display frame DF1 corresponding to the fingerprint sensing request D1 ends. That is, the second driving circuit 122 performs the sensor reset operation SR and the image capture operation IC of the fingerprint sensing operation FP in different display periods of the frame period SP1 (skip period), as shown in FIG. 10. Therefore, in the embodiment shown in FIG. 10, each of the first polarity configuration (i.e., frame polarity configuration of the display panel 110 when performing the sensor reset operation SR) and the second polarity configuration (i.e., frame polarity configuration of the display panel 110 when performing the image capture operation IC) is the positive polarity configuration+Frame.

Therefore, in the embodiment shown in FIG. 9 and FIG. 10, when performing the sensor reset operation FP on a same fingerprint sensing area, each of the first polarity configuration and the second polarity configuration is the positive polarity configuration+Frame. The second driving circuit 122 may perform the fingerprint sensing operation FP on the display panel 110 according to the timing control signal INF, and the fingerprint sensing operation FP is performed with the same frame polarity configuration rule. That is, the second driving circuit 122 performs the sensor reset operation SR and the image capture operation IC when the display panel 110 is in the positive polarity configuration+Frame whenever the fingerprint sensing operation FP is performed on the display panel 110. In this way, the quality of a fingerprint image can be improved as much as possible.

Figure 11:
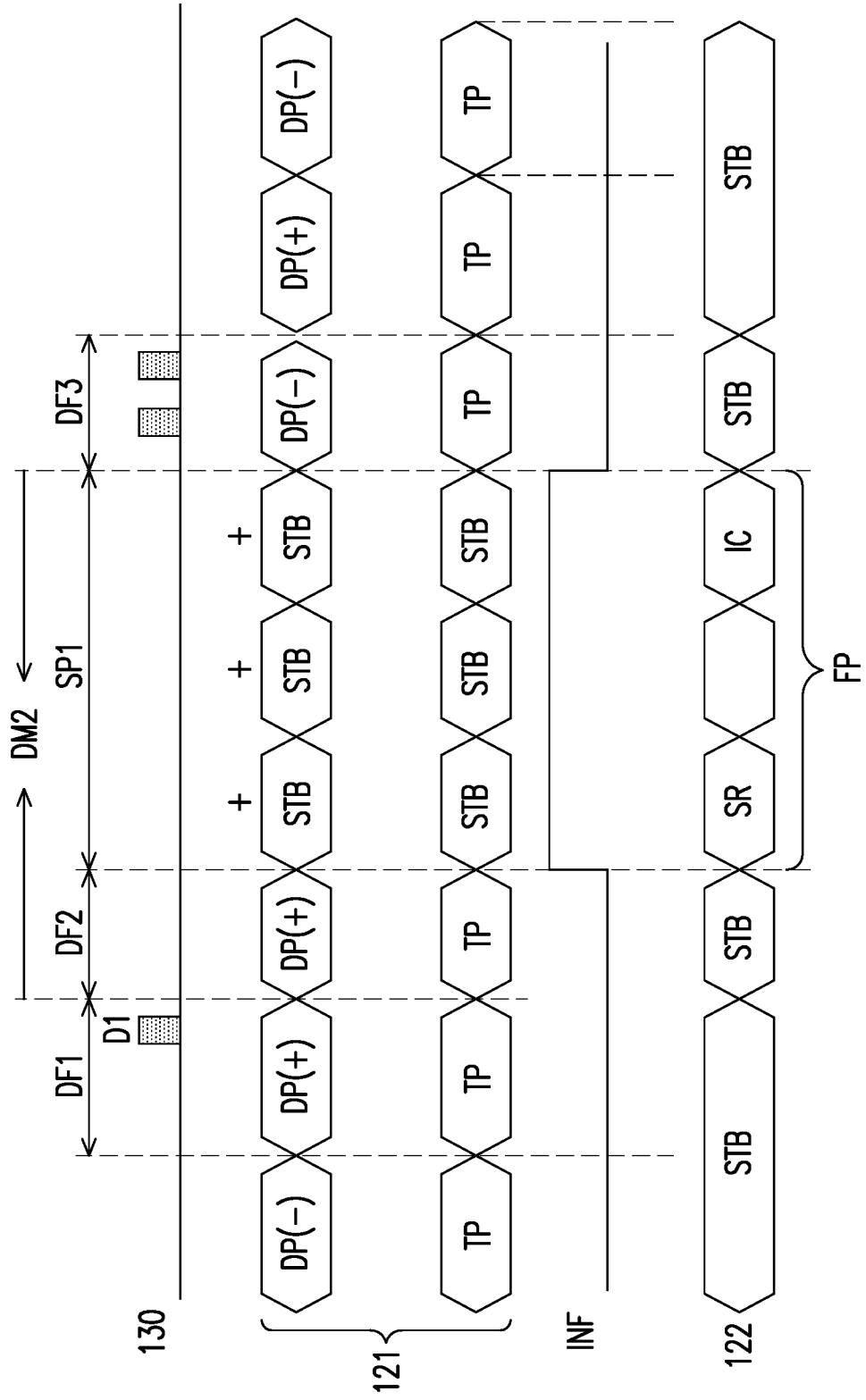
FIG. 11 is a timing diagram of multiple frame periods according to still another embodiment of the disclosure.

FIG. 11 is a timing diagram of multiple frame periods according to still another embodiment of the disclosure. The horizontal axis shown in FIG. 11 represents time. Some of the multiple frame periods shown in FIG. 11 are labeled as DF1, DF2, SP1, and DF3, wherein the frame period SP1 (skip period) includes multiple display frame periods. Different from the operation method for generating the timing shown in FIGS. 9 and 10, another operation method may result in the different timing shown in FIG. 11.

Please refer to FIG. 1 and FIG. 11. In the current frame period DF1 (in the first driving mode DM1), the first driving circuit 121 receives the fingerprint sensing request D1 from the application processor 130. In response to the fingerprint sensing request D1 received, regardless of the current frame polarity configuration of the display panel 110, the first driving circuit 121 performs at least the display driving operation DP before the fingerprint sensing operation FP starts, such that another frame (frame of the frame period DF2, which is labeled as "DP(+)" in FIG. 11) may be displayed using the frame polarity configuration (for example, positive polarity configuration+Frame) meeting the preconfigured frame polarity configuration rule. For the frame periods SP1 and DF3 shown in FIG. 11, reference may be made to the relevant descriptions of the frame periods SP1 and DF3 shown in FIG. 9 or the relevant descriptions of the frame periods SP1 and DF2 shown in FIG. 10, so there will be no reiteration here.

Through the operation method shown in FIG. 11, the second driving circuit 122 may perform the sensor reset operation SR and the image capture operation IC when the display panel 110 is in the positive polarity configuration+Frame. That is, each of the first polarity configuration and the second polarity configuration is the positive polarity configuration+Frame. Therefore, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

It should be noted that the embodiments shown in FIG. 9, FIG. 10, and FIG. 11 take "each of the first polarity configuration and the second polarity configuration is the positive polarity configuration+Frame" as illustrative examples, but the implementation manner is not limited thereto. For example, in other embodiments, each of the first polarity configuration (i.e., frame polarity configuration of the display panel 110 when performing the sensor reset operation SR) and the second polarity configuration (i.e., frame polarity configuration of the display panel 110 when performing the image capture operation IC) may be the negative polarity configuration−Frame.

Figure 12:
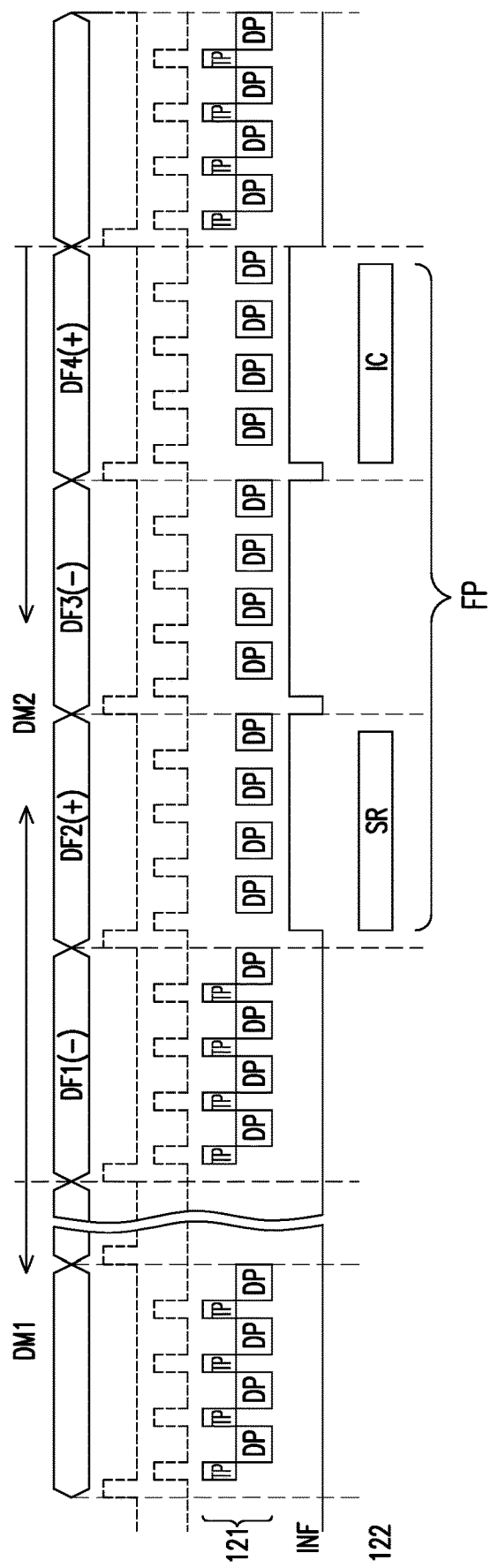
FIG. 12 is a timing diagram of multiple frame periods according to again another embodiment of the disclosure.

FIG. 12 is a timing diagram of multiple frame periods according to again another embodiment of the disclosure. The horizontal axis shown in FIG. 12 represents time. Please refer to FIG. 1 and FIG. 12. The first driving device 121 performs the first driving mode DM1 in the frame period before the frame period DF1 and performs the second driving mode DM2 in the frame periods DF1, DF2, DF3, and DF4. In this embodiment, in the frame periods DF2 to DF3, the first driving circuit 121 keeps the display driving operation DP but suspend the touch sensing operation TP. In other embodiments, the first driving circuit 121 may keep performing the touch sensing operation TP and the display driving operation DP in the frame period DF3, and the first driving circuit 121 suspends performing the touch sensing operation TP and keeps performing the display driving operation DP in the frame periods DF2 and DF4 (skip periods).

The second driving circuit 122 performs the fingerprint sensing operation FP in the skip periods SP1 and SP2 according to the timing control signal INF. The frame polarity configuration of the display panel 110 is the negative polarity configuration−Frame (labeled as "DP1(−)" in FIG. 12) in frame period DF1. In the frame period DF2 immediately after the frame period DF1, the first driving circuit 121 performs the display driving operation DP on the display panel 110 with the positive polarity configuration+Frame (labeled as "DP2(+)" in FIG. 12). In the frame period DF2, the second driving circuit 122 performs the sensor reset operation SR of the fingerprint sensing operation FP. In the frame period DF3 immediately after the frame period DF2, the first driving circuit 121 performs the display driving operation DP on the display panel 110 with the negative polarity configuration−Frame (labeled as "DP3(−)" in FIG. 12). In the frame period DF4 immediately after the frame period DF3, the first driving circuit 121 performs the display driving operation DP on the display panel 110 with the positive polarity configuration+Frame (labeled as "DP4(+)" in FIG. 12). In the frame period DF4, the second driving circuit 122 performs the image capture operation IC of the fingerprint sensing operation FP.

The embodiment shown in FIG. 12 may be deduced by analogy with reference to the relevant descriptions in FIG. 6 to FIG. 8. Therefore, when performing the sensor reset operation FP on a same fingerprint sensing area, the first polarity configuration (i.e., frame polarity configuration of the display panel 110 when performing the sensor reset operation SR) is the positive polarity configuration+Frame and the second polarity configuration (i.e., frame polarity configuration of the display panel 110 when performing the image capture operation IC) is the negative polarity configuration−Frame. That is, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

It should be noted that the embodiment shown in FIG. 12 takes "the first polarity configuration as the positive polarity configuration+Frame and the second polarity configuration as the negative polarity configuration−Frame" as the preconfigured frame polarity configuration rule as an illustrative example, but the embodiment is not limited thereto. For example, in other embodiments, the first polarity configuration (i.e., frame polarity configuration of the display panel 110 when performing the sensor reset operation SR) may be the negative polarity configuration−Frame and the second polarity configuration (i.e., frame polarity configuration of the display panel 110 when performing the image capture operation IC) may be the positive polarity configuration+Frame. In again some other embodiments, the first polarity configuration and the second polarity configuration may be the same negative polarity configuration−Frame. In yet some other embodiments, the first polarity configuration and the second polarity configuration may be the same positive polarity configuration+Frame.

Figure 13:
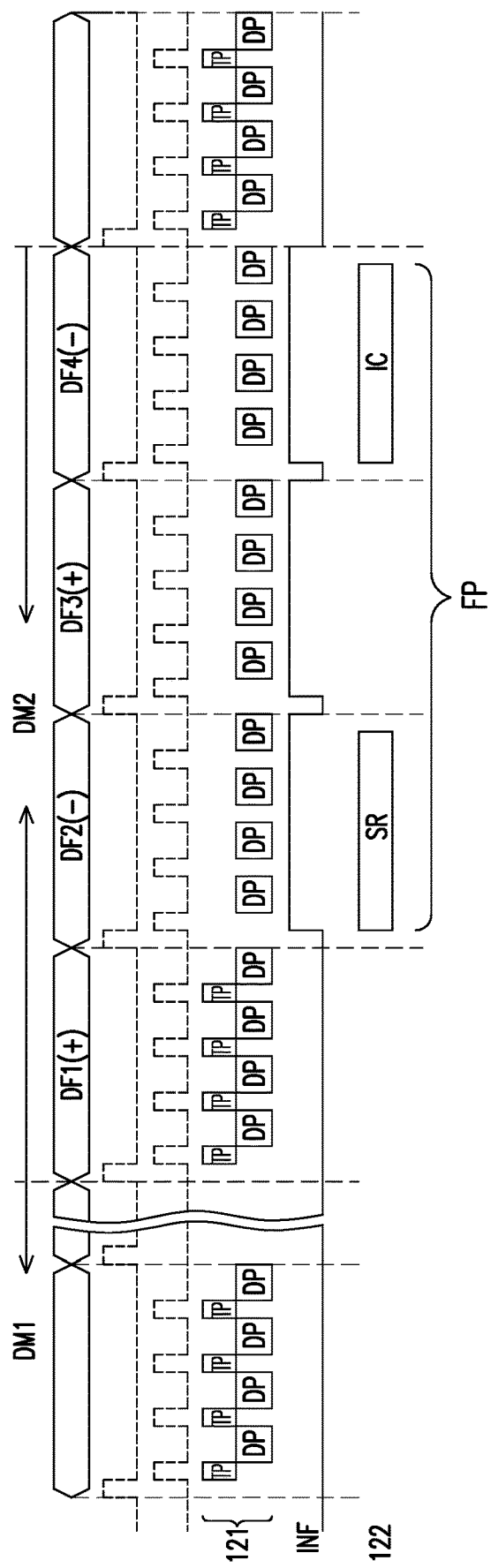
FIG. 13 is a timing diagram of multiple frame periods according to yet another embodiment of the disclosure.

For example, FIG. 13 is a timing diagram of multiple frame periods according to yet another embodiment of the disclosure. The horizontal axis shown in FIG. 13 represents time. Please refer to FIG. 1 and FIG. 13. The embodiment shown in FIG. 13 may be deduced by analogy with reference to the relevant descriptions in FIG. 12, so there will be no reiteration here. Different from the embodiment shown in FIG. 12, in the embodiment shown in FIG. 13, the frame polarity configuration of the display panel 110 in the frame period DF1 is the positive polarity configuration+Frame (labeled as "DP1(+)" in FIG. 13), the frame polarity configuration of the display panel 110 in the frame period DF2 is the negative polarity configuration−Frame (labeled as "DP2(−)" in FIG. 13), the frame polarity configuration of the display panel 110 in the frame period DF3 is the positive polarity configuration+Frame (labeled as "DP3(+)" in FIG. 13), and the frame polarity configuration of the display panel 110 in the frame period DF4 is the negative polarity configuration−Frame (labeled as "DP4(−)" in FIG. 13).

When performing the sensor reset operation FP on a same fingerprint sensing area, the first polarity configuration (i.e., frame polarity configuration of the display panel 110 when performing the sensor reset operation SR) is the negative polarity configuration−Frame and the second polarity configuration (i.e., frame polarity configuration of the display panel 110 when performing the image capture operation IC) is the positive polarity configuration+Frame. That is, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

Figure 14:
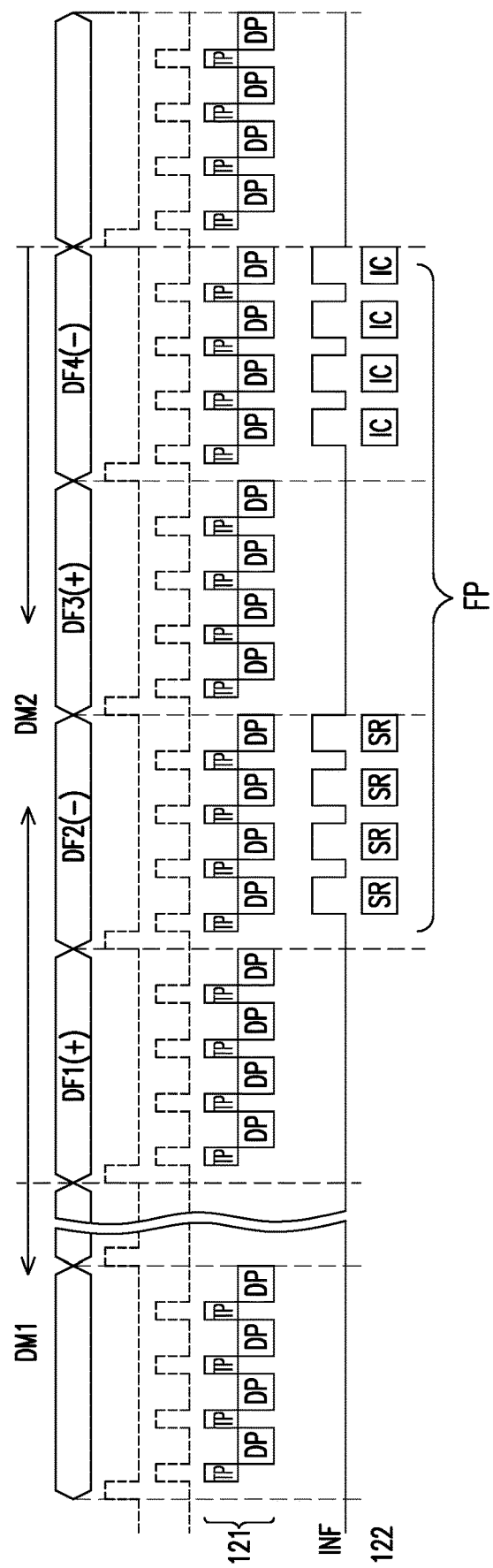
FIG. 14 is a timing diagram of multiple frame periods according to another embodiment of the disclosure.

FIG. 14 is a timing diagram of multiple frame periods according to another embodiment of the disclosure. The horizontal axis shown in FIG. 14 represents time. The embodiment shown in FIG. 14 may be deduced by analogy with reference to the relevant descriptions in FIG. 13, so there will be no reiteration here. Please refer to FIG. 1 and FIG. 14. Different from the embodiment shown in FIG. 13, in the embodiment shown in FIG. 14, the first driving circuit 121 keeps performing the touch sensing operation TP and the display driving operation DP in the frame periods DF2 and DF4. In the skip periods (frame periods DF2 and DF4), the first driving circuit 121 and the second driving circuit 122 respectively perform the touch sensing operation TP and the fingerprint sensing operation FP in a time-divisional manner.

When performing the sensor reset operation FP on a same fingerprint sensing area, the first polarity configuration (i.e., frame polarity configuration of the display panel 110 when performing the sensor reset operation SR) is the negative polarity configuration−Frame and the second polarity configuration (i.e., frame polarity configuration of the display panel 110 when performing the image capture operation IC) is the positive polarity configuration+Frame. That is, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

Figure 15A:
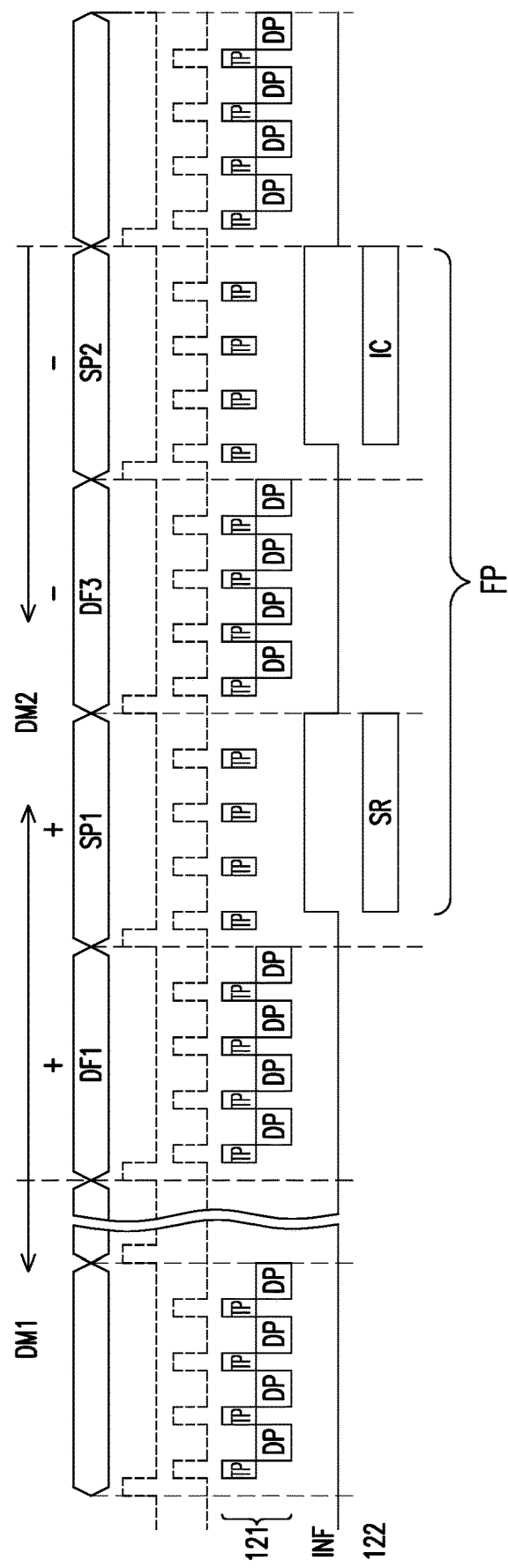
FIG. 15A is a timing diagram of multiple frame periods according to another embodiment of the disclosure.

FIG. 15A is a timing diagram of multiple frame periods according to another embodiment of the disclosure. The horizontal axis shown in FIG. 15A represents time. Please refer to FIG. 1 and FIG. 15A. The embodiment shown in FIG. 15A may be deduced by analogy with reference to the relevant descriptions in FIG. 12, so there will be no reiteration here. Different from the embodiment shown in FIG. 12, in the embodiment shown in FIG. 15A, the first driving circuit 121 keeps performing the touch sensing operation TP and suspends performing the display driving operation DP in the skip periods (frame periods SP1 and SP2). In the skip periods (frame periods SP1 and SP2), the first driving circuit 121 perform the touch sensing operation TP in a time-divisional manner according to the original timing, and the fingerprint sensing operation FP of the second driving circuit 122 is not time-divisionally operated with the touch sensing operation TP. Or in another embodiment, during the skip period (frame periods SP1 and SP2), the first driving circuit 121 suspends performing the display driving operation DP and the touch sensing operation TP, and the second driving circuit 122 performs the fingerprint sensing operation FP, and performs the fingerprint sensing operation continuously rather than time-divisionally.

Figure 15B:
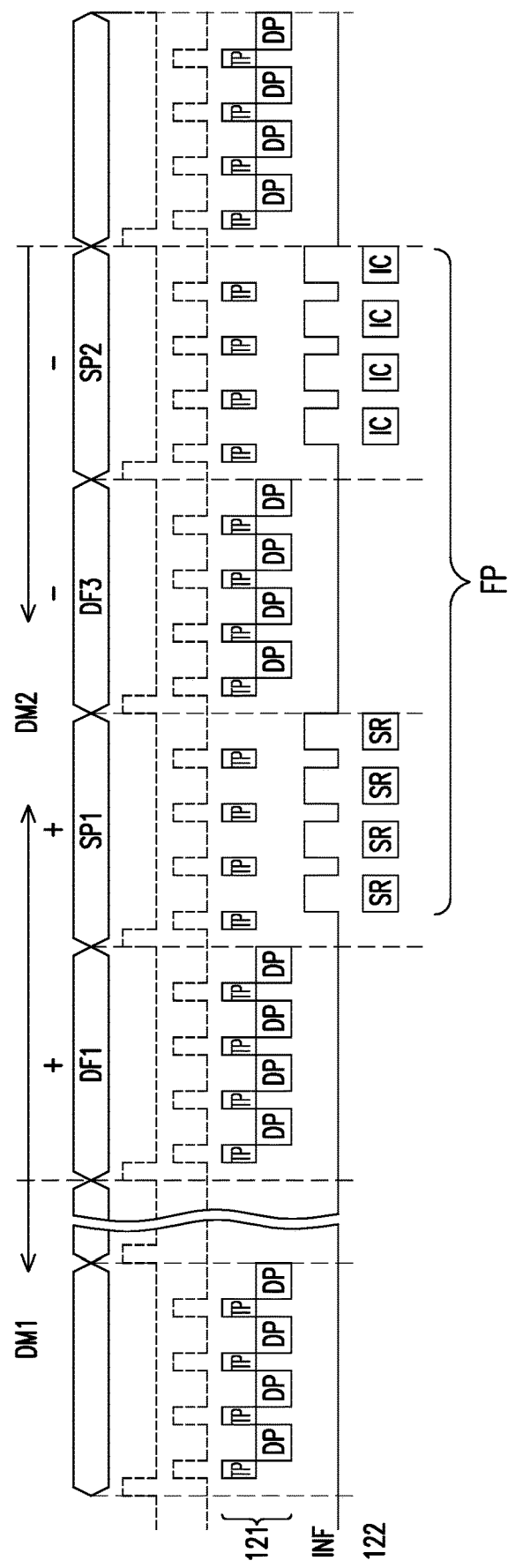
FIG. 15B is a timing diagram of multiple frame periods according to yet another embodiment of the disclosure.

FIG. 15B is a timing diagram of multiple frame periods according to another embodiment of the disclosure. The difference from FIG. 15A is that, in the embodiment shown in FIG. 15B, the first driving circuit 121 keeps performing the touch sensing operation TP and suspends the execution of the display driving operation DP in the skip period (frame periods SP1 and SP2). In the skip period (frame periods SP1 and SP2). In the skip period (frame periods SP1 and SP2), the first driving circuit 121 and the second driving circuit 122 respectively perform the touch sensing operation TP and the fingerprint sensing operation FP in a time divisional manner, and the operation periods of the two operations do not overlap. Or in another embodiment, during the skip period (frame periods SP1 and SP2), the first driving circuit 121 suspends performing the display driving operation DP and the touch sensing operation TP, and the second driving circuit 122 performs the fingerprint sensing operation FP in a time divisional manner (which means FP and DP are operated time-divisionally).

When performing the sensor reset operation FP on a same fingerprint sensing area, the first polarity configuration (i.e., frame polarity configuration of the display panel 110 when performing the sensor reset operation SR) is the positive polarity configuration+Frame and the second polarity configuration (i.e., frame polarity configuration of display panel 110 when performing the image capture operation IC) is the negative polarity configuration–Frame. That is, the second driving circuit 122 may perform the fingerprint sensing operation FP on the display panel 110 according to the timing control signal INF, and the fingerprint sensing operation FP is performed with the same frame polarity configuration rule. In this way, the quality of a fingerprint image can be improved as much as possible.

Figure 16:
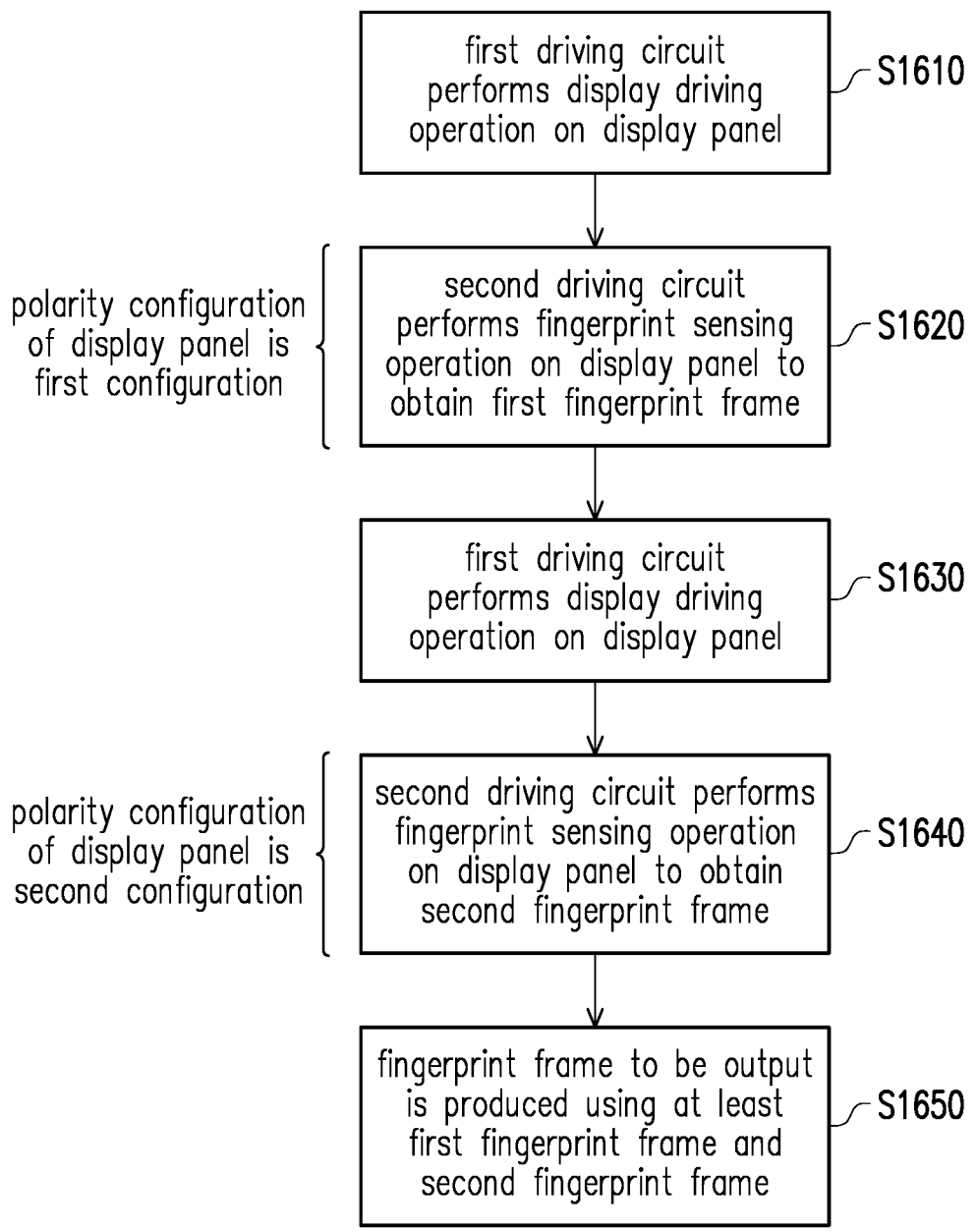
FIG. 16 is a flowchart of an operation method of a driving device according to another embodiment of the disclosure.

FIG. 16 is a flowchart of an operation method of a driving device 120 according to another embodiment of the disclosure. Please refer to FIG. 1 and FIG. 16. In Step S1610, the first driving circuit 121 may perform the display driving operation DP and/or the touch sensing operation TP on the display panel 110, such that the frame polarity configuration of the display panel 110 is a first configuration. In Step S1620, the second driving circuit 122 may perform a first fingerprint sensing operation FP1 on the display panel 110 according to the timing control signal INF to obtain a first fingerprint frame. When performing the first fingerprint frame sensing operation FP1, the frame polarity configuration of the display panel 110 is still the first configuration. In Step S1630, the first driving circuit 121 may perform the display driving operation DP and/or the touch sensing operation TP on the display panel 110, such that the frame polarity configuration of the display panel 110 is a second configuration (different from the first configuration). In Step S1640, the second driving circuit 122 may perform a second fingerprint sensing operation FP2 on the display panel 110 according to the timing control signal INF to obtain a second fingerprint frame. During the second fingerprint frame sensing operation FP2, the frame polarity configuration of the display panel 110 is still the second configuration. In Step S1650, the second driving circuit 122 may produce a fingerprint frame to be output to the application processor 130 according to at least the first fingerprint frame and the second fingerprint frame. As mentioned above, the term "fingerprint frame" refers to the fingerprint sensing data obtained by the second driving circuit 122 performing a complete fingerprint sensing operation on a fingerprint sensing area in the fingerprint sensor array, which is a digital data obtained after the analog sensing signal is converted, and it is not limited to corresponding to a complete fingerprint or a partial fingerprint.

Figure 17:
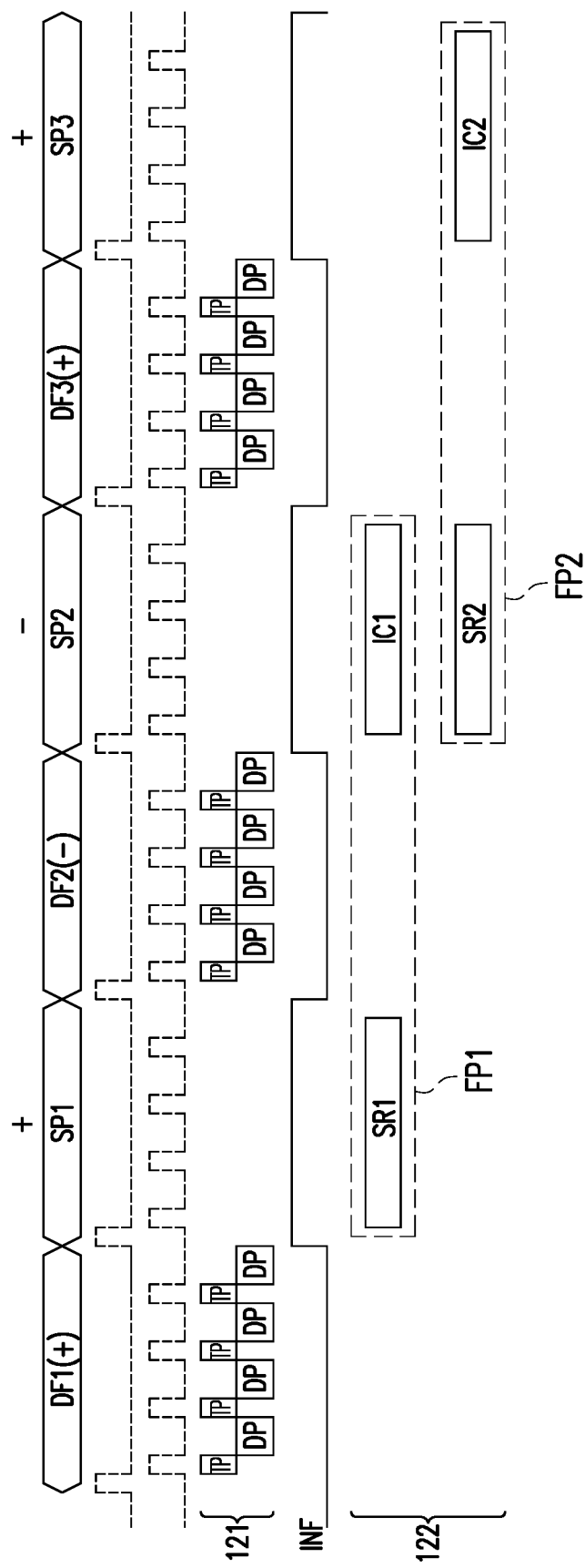
FIG. 17 is a timing diagram of multiple frame periods according to yet another embodiment of the disclosure.

FIG. 17 is a timing diagram of multiple frame periods according to yet another embodiment of the disclosure. The horizontal axis shown in FIG. 17 represents time. The embodiment shown in FIG. 17 may be deduced by analogy with reference to the relevant descriptions in FIG. 12. Some of the multiple frame periods shown in FIG. 17 are labeled as DF1, SP1, DF2, SP2, DF3, and SP3. The second driving circuit 122 performs the first fingerprint frame sensing operation FP1 in the frame periods SP1 and SP2, wherein the first fingerprint frame sensing operation FP1 includes a sensor reset operation SR1 and an image capture operation IC1. The second driving circuit 122 performs the second fingerprint frame sensing operation FP2 in the frame periods SP2 and SP3, wherein the second fingerprint frame sensing operation FP2 includes a sensor reset operation SR2 and an image capture operation IC2.

The first driving circuit 121 performs the display driving operation DP on the display panel 110 with the positive polarity configuration+Frame (labeled as "DP1(+)" in FIG. 17) in the frame period DF1. Since the first driving circuit 121 performs the display driving operation DP on the display panel 110 with the positive polarity configuration+Frame in the frame period DF1, the frame polarity configuration of the display panel 110 in the frame period SP1 is still the positive polarity configuration+Frame (labeled as "+" in FIG. 17). The second driving circuit 122 may perform the sensor reset operation SR1 of the first fingerprint sensing operation FP1 on the display panel 110 in the frame period SP1 according to the timing control signal INF. In the frame period DF2 immediately after the frame period SP1, the first driving circuit 121 performs the display driving operation DP on the display panel 110 with the negative polarity configuration–Frame (labeled as "DP2(-)" in FIG. 17). Since the first driving circuit 121 performs the display driving operation DP on the display panel 110 with the negative polarity configuration–Frame in the frame period DF2, the frame polarity configuration of the display panel 110 in the frame period SP2 immediately after the frame period DF2 is still the negative polarity configuration–Frame (labeled as "-" in FIG. 17). In the frame period SP2, the second driving circuit 122 performs the image capture operation IC1 of the first fingerprint sensing operation FP1 to obtain the first fingerprint frame.

In the frame period SP2, the second driving circuit 122 may also perform the sensor reset operation SR2 of the second fingerprint sensing operation FP2 on the display panel 110 according to the timing control signal INF. In the frame period DF3 immediately after the frame period SP2, the first driving circuit 121 performs the display driving operation DP on the display panel 110 with the positive polarity configuration+Frame (labeled as "DP3(+)" in FIG. 17). Since the first driving circuit 121 performs the display driving operation DP on the display panel 110 with the positive polarity configuration+Frame in the frame period DF3, the frame polarity configuration of the display panel 110 in the frame period SP3 immediately after the frame period DF3 is still the positive polarity configuration+Frame (labeled as "+" in FIG. 17). In the frame period SP3, the second driving circuit 122 performs the image capture operation IC2 of the second fingerprint sensing operation FP2 to obtain the second fingerprint frame.

The second driving circuit 122 may produce the fingerprint frame to be output to the application processor 130 according to at least the first fingerprint frame of the first fingerprint sensing operation FP1 and the second fingerprint frame of the second fingerprint sensing operation FP2 to. For example, the second driving circuit 122 may perform average pixel value calculation on the first fingerprint frame and the second fingerprint frame to produce the fingerprint frame to be output, or give different weights to each fingerprint frame generated at different time points to generate a weighted average as the fingerprint frame to be output, which is not limited thereto. In another embodiment, the second driving circuit 122 may not perform step S1650, but send the first fingerprint frame obtained by the first fingerprint sensing operation FP1 and the second fingerprint frame obtained by the second fingerprint sensing operation FP2 to the application processor 130, and the application processor 130 performs averaging calculation or other signal processing to produce the final fingerprint frame.

Figure 18:
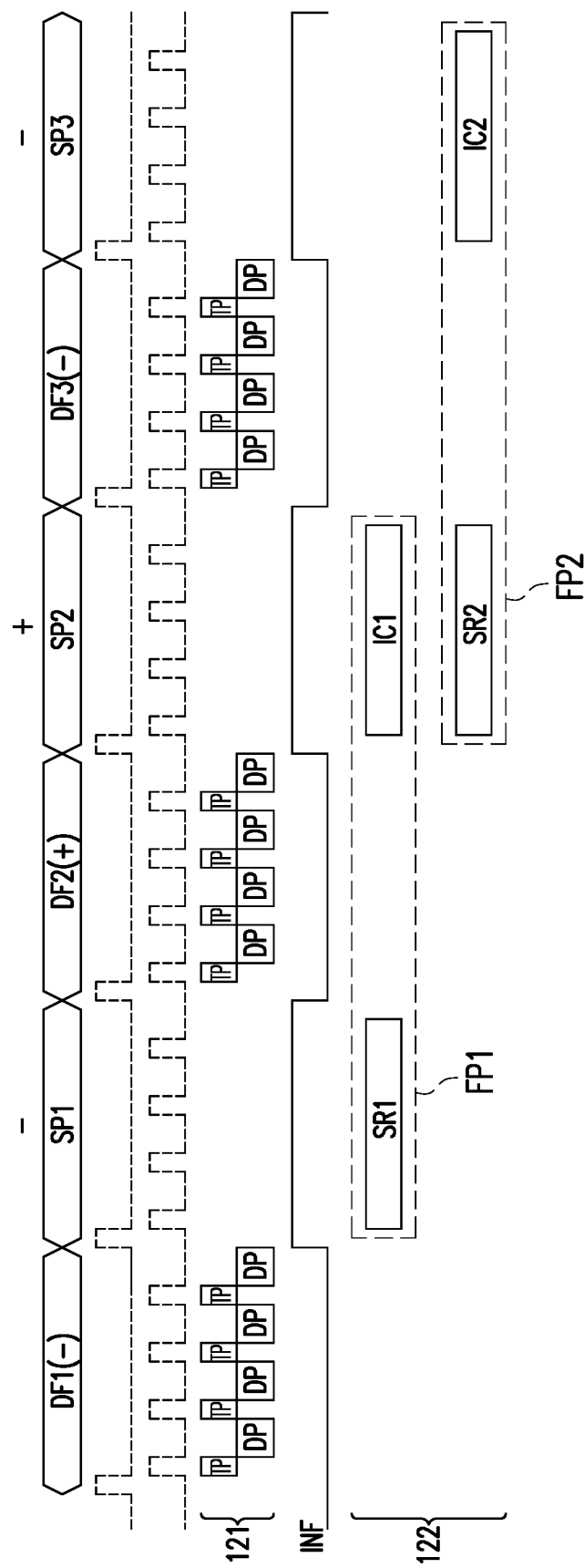
FIG. 18 is a timing diagram of multiple frame periods according to again another embodiment of the disclosure.

FIG. 18 is a timing diagram of multiple frame periods according to again another embodiment of the disclosure. The horizontal axis shown in FIG. 18 represents time. Some of the multiple frame periods shown in FIG. 18 are labeled as DF1, SP1, DF2, SP2, DF3, and SP3. The embodiment shown in FIG. 18 may be deduced by analogy with reference to the related descriptions in FIG. 17. Different from the embodiment shown in FIG. 17, in the embodiment shown in FIG. 18, the first driving circuit 121 performs the display driving operation DP on the display panel 110 with the negative polarity configuration–Frame (labeled as "DP1(–)" in FIG. 18) in the frame period DF1, performs the display driving operation DP on the display panel 110 with the positive polarity configuration+Frame (labeled as "DP2(+)" in FIG. 18) in the frame period DF2, and performs the display driving operation DP on the display panel 110 with the negative polarity configuration–Frame (labeled as "DP3 (–)" in FIG. 18) in the frame period DF3. Therefore, the frame polarity configuration of the display panel 110 in the frame period SP1 keeps the same negative polarity configuration–Frame (labeled as "–" in FIG. 18) as in the frame period DF1, the frame polarity configuration of the display panel 110 in the frame period SP2 keeps the same positive polarity configuration+Frame (labeled as "+" in FIG. 18) as in the frame period DF2, and the frame polarity configuration of display panel 110 in the frame period SP3 keeps the same negative polarity configuration–Frame (labeled as "–" in FIG. 18) as in the frame period DF3.

Figure 19:
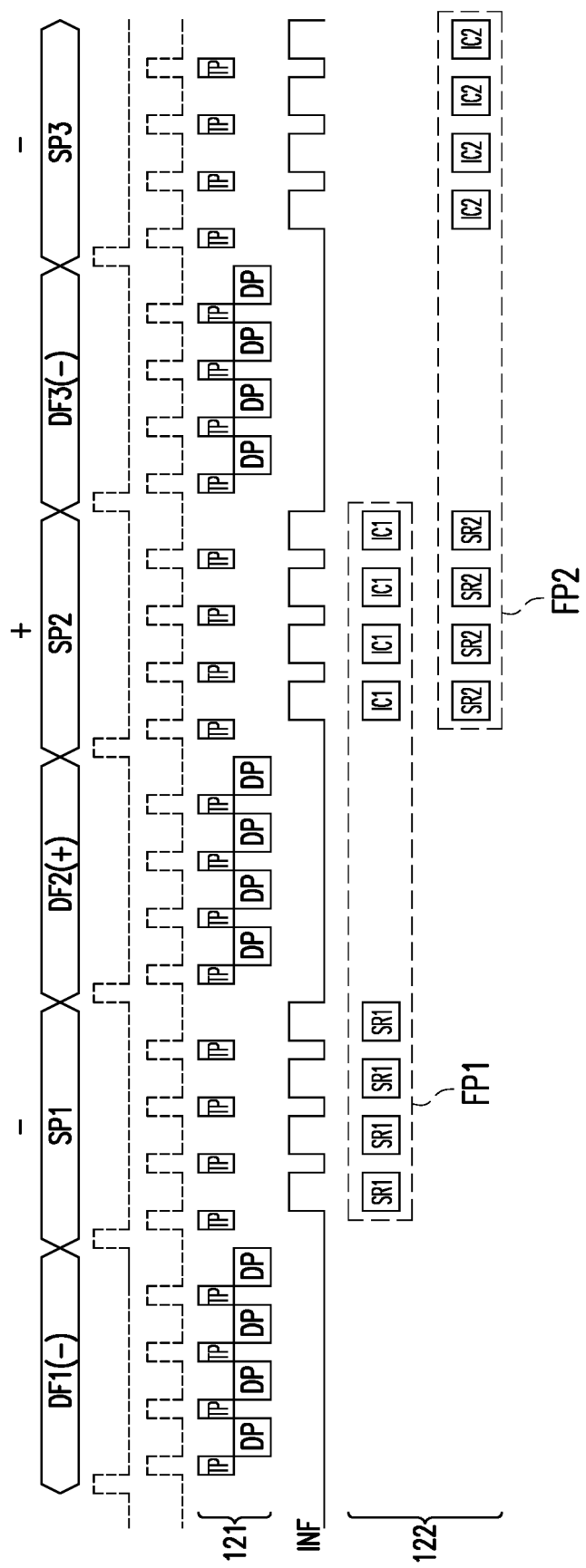
FIG. 19 is a timing diagram of multiple frame periods according to still another embodiment of the disclosure.

FIG. 19 is a timing diagram of multiple frame periods according to still another embodiment of the disclosure. The horizontal axis shown in FIG. 19 represents time. Some of the multiple frame periods shown in FIG. 19 are labeled as DF1, SP1, DF2, SP2, DF3, and SP3. The embodiment shown in FIG. 19 may be deduced by analogy with reference to the related descriptions in FIG. 18. Please refer to FIG. 1 and FIG. 19. Different from the embodiment shown in FIG. 18, in the embodiment shown in FIG. 19, the first driving circuit 121 keeps performing the touch sensing operation TP and suspends the display driving operation DP in the frame periods SP1, SP2, and SP3. In the frame periods SP1, SP2, and SP3, the first driving circuit 121 and the second driving circuit 122 respectively perform the touch sensing operation TP and the fingerprint sensing operation FP (such as the first fingerprint sensing operation FP1 and the second fingerprint sensing operation FP2) in a time-divisional manner, as shown in FIG. 19.

Figure 20:
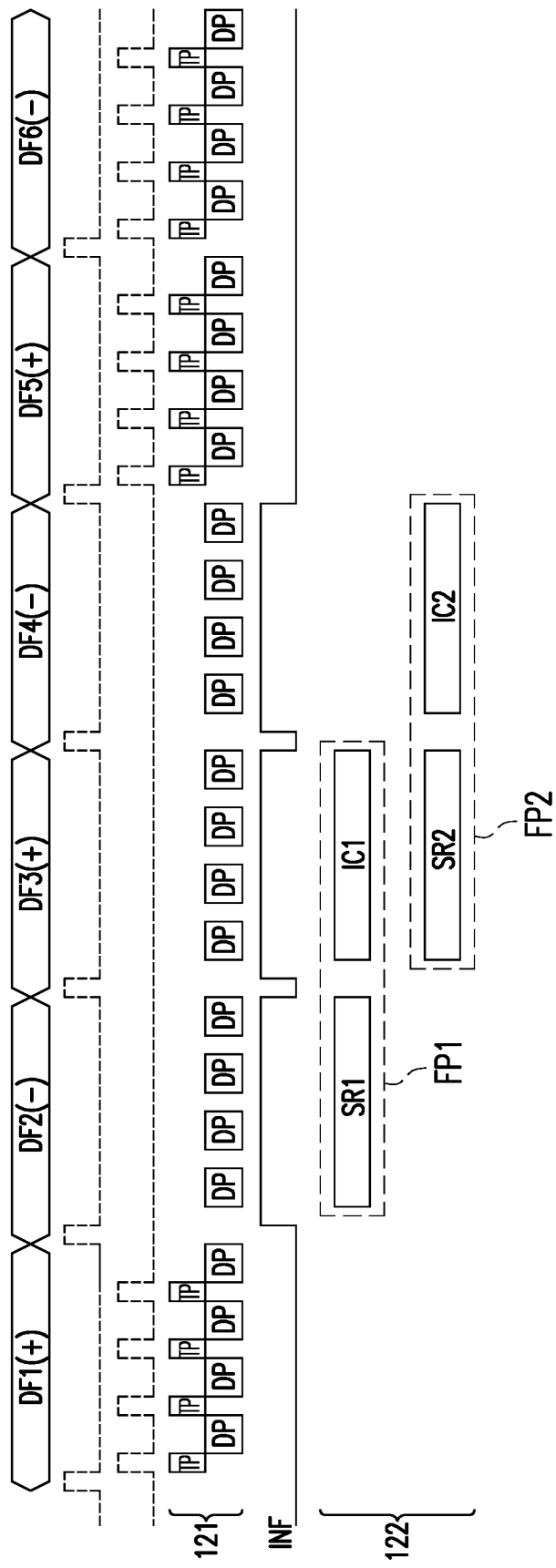
FIG. 20 is a timing diagram of multiple frame periods according to again another embodiment of the disclosure.

FIG. 20 is a timing diagram of multiple frame periods according to again another embodiment of the disclosure. The horizontal axis shown in FIG. 20 represents time. Some of the multiple frame periods shown in FIG. 20 are labeled as DF1, DF2, DF3, DF4, DF5, and DF6. The embodiment shown in FIG. 20 may be deduced by analogy with reference to the related descriptions in FIG. 17. Different from the embodiment shown in FIG. 17, in the embodiment shown in FIG. 20, the first driving circuit 121 keeps performing the display driving operation DP in the skip periods (frame periods DF2, DF3, and DF4), but suspends performing the touch sensing operation TP.

Please refer to FIG. 1 and FIG. 20. The first driving circuit 121 performs the display driving operation DP on the display panel 110 with the positive polarity configuration+ Frame (labeled as "DP1(+)" in FIG. 20) in the frame period DF1. The first driving circuit 121 performs the display driving operation DP on the display panel 110 with the negative polarity configuration–Frame (labeled as "DP2(–)" in FIG. 20) in the frame period DF2. The second driving circuit 122 may perform the sensor reset operation SR1 of the first fingerprint sensing operation FP1 on the display panel 110 according to the timing control signal INF in the frame period DF2. The first driving circuit 121 performs the display driving operation DP on the display panel 110 with the positive polarity configuration+Frame (labeled as "DP3 (+)" in FIG. 20) in the frame period DF3. In the frame period DF3, the second driving circuit 122 performs the image capture operation IC1 of the first fingerprint sensing operation FP1 to obtain the first fingerprint frame.

In the frame period DF3, the second driving circuit 122 may also perform the sensor reset operation SR2 of the second fingerprint sensing operation FP2 on the display panel 110 according to the timing control signal INF. The first driving circuit 121 performs the display driving operation DP on the display panel 110 with the negative polarity configuration–Frame (labeled as "DP4(–)" in FIG. 20) in the frame period DF4. In the frame period DF4, the second driving circuit 122 performs an image capture operation IC3 of the second fingerprint sensing operation FP2 to obtain the second fingerprint frame. The first driving circuit 121 performs the display driving operation DP on the display panel 110 with the positive polarity configuration+Frame (labeled as "DP5(+)" in FIG. 20) in the frame period DF5. The first driving circuit 121 performs the display driving operation DP on the display panel 110 with the negative polarity configuration–Frame (labeled as "DP6(–)" in FIG. 20) in the frame period DF6.

Figure 21:
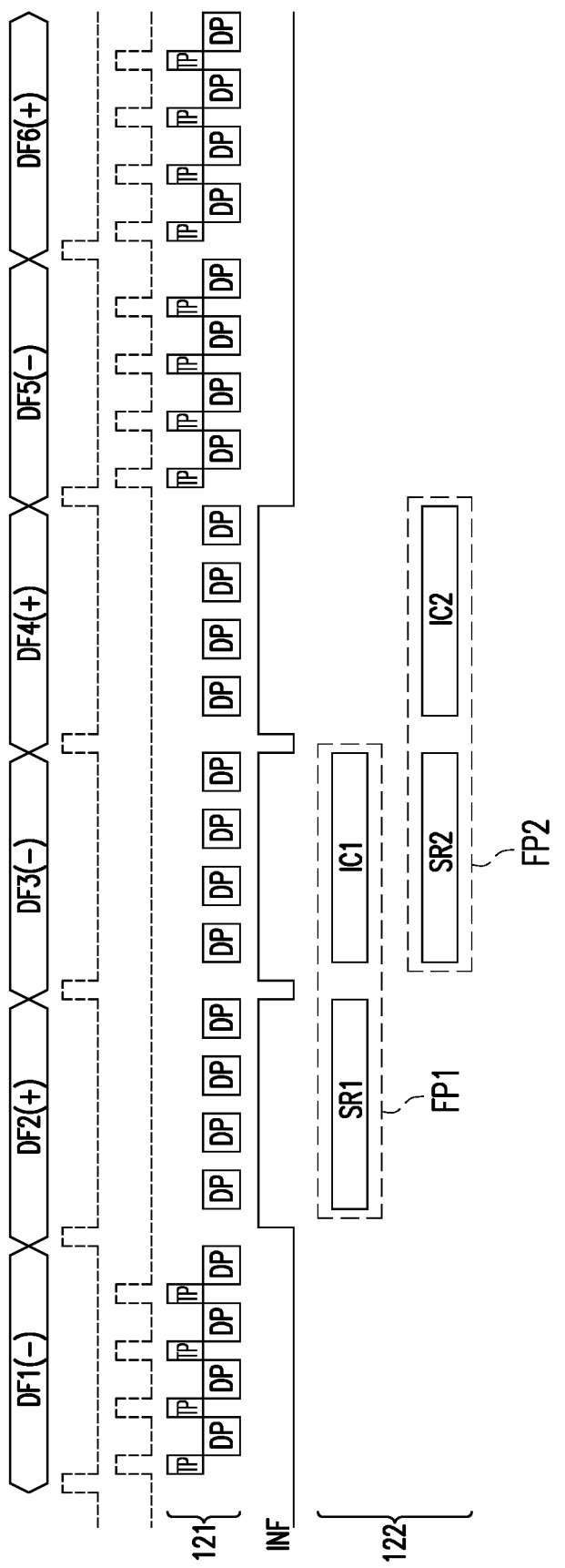
FIG. 21 is a timing diagram of multiple frame periods according to yet another embodiment of the disclosure.

FIG. 21 is a timing diagram of multiple frame periods according to yet another embodiment of the disclosure. The horizontal axis shown in FIG. 21 represents time. Some of the multiple frame periods shown in FIG. 21 are labeled as DF1, DF2, DF3, DF4, DF5, and DF6. The embodiment shown in FIG. 21 may be deduced by analogy with reference to the related descriptions in FIG. 20. Different from the embodiment shown in FIG. 20, in the embodiment shown in FIG. 21, the first driving circuit 121 performs the display driving operation DP on the display panel 110 with the negative polarity configuration–Frame (labeled as "DP1(–)" in FIG. 21) in the frame period DF1, performs the display driving operation DP on the display panel 110 with the positive polarity configuration+Frame (labeled as "DP2(+)" in FIG. 21) in the frame period DF2, performs the display driving operation DP on the display panel 110 with the negative polarity configuration–Frame (labeled as "DP3(–)" in FIG. 21) in the frame period DF3, performs the display driving operation DP on the display panel 110 with the positive polarity configuration+Frame (labeled as "DP4(+)" in FIG. 21) in the frame period DF4, performs the display driving operation DP on the display panel 110 with the negative polarity configuration–Frame (labeled as "DP5(–)" in FIG. 21) in the frame period DF5, and performs the display driving operation DP on the display panel 110 with the positive polarity configuration+Frame (labeled as "DP6 (+)" in FIG. 21) in the frame period DF6.

Figure 22:
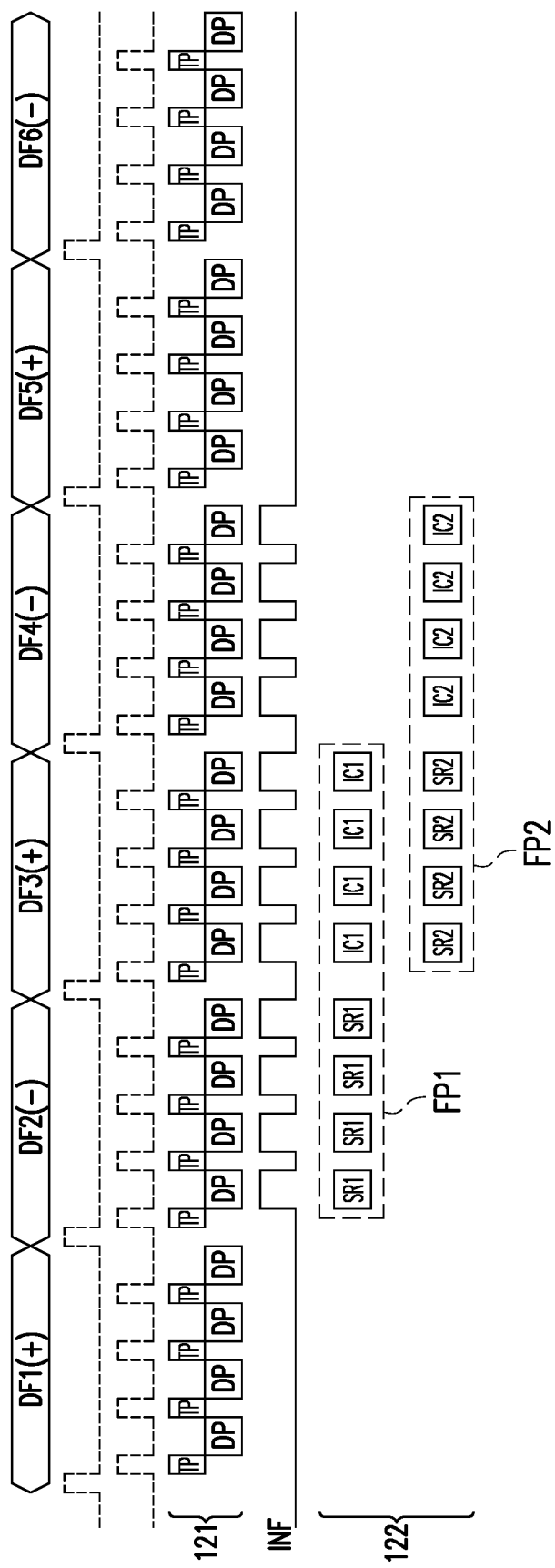
FIG. 22 is a timing diagram of multiple frame periods according to still another embodiment of the disclosure.

FIG. 22 is a timing diagram of multiple frame periods according to still another embodiment of the disclosure. The horizontal axis shown in FIG. 22 represents time. Some of the multiple frame periods shown in FIG. 22 are labeled as DF1, DF2, DF3, DF4, DF5, and DF6. The embodiment shown in FIG. 22 may be deduced by analogy with reference to the related descriptions in FIG. 20. Please refer to FIG. 1 and FIG. 22. Different from the embodiment shown in FIG. 20, in the embodiment shown in FIG. 22, the first driving circuit 121 keeps performing the touch sensing operation TP and the display driving operation DP in the frame periods DF2, DF3, and DF4. In the frame periods DF2, DF3, and DF4, the first driving circuit 121 and the second driving circuit 122 respectively perform the touch sensing operation TP and the fingerprint sensing operation FP (for example, first fingerprint sensing operation FP1 and second fingerprint sensing operation FP2), as shown in FIG. 22.

FIG. 23 to FIG. 26 are timing diagrams of multiple frame periods according to still another embodiments of the disclosure. Some of the multiple display frame periods shown in FIGS. 23 to 26 are denoted as DF1, DF2, DF3, and DF4. The difference from the previous embodiments is that the second driving mode DM2 of the embodiments shown in FIG. 23 to FIG. 26 is the porch mode. In the porch mode, the first driving circuit 121 is configured to periodically perform an operation period having the same length as the frame period in the porch mode. The porch interval PL can be regarded as a skip period, and the length of the porch interval PL can be configured by the application processor. Each skip period (i.e., the porch interval PL) in each operation cycle in the second driving mode DM2 can be used to perform a fingerprint sensing operation. The following briefly describes the differences between the examples in FIG. 23 to FIG. 26. For the meanings of symbols of related signals and component, please refer to the aforementioned other drawings.

Figure 23:
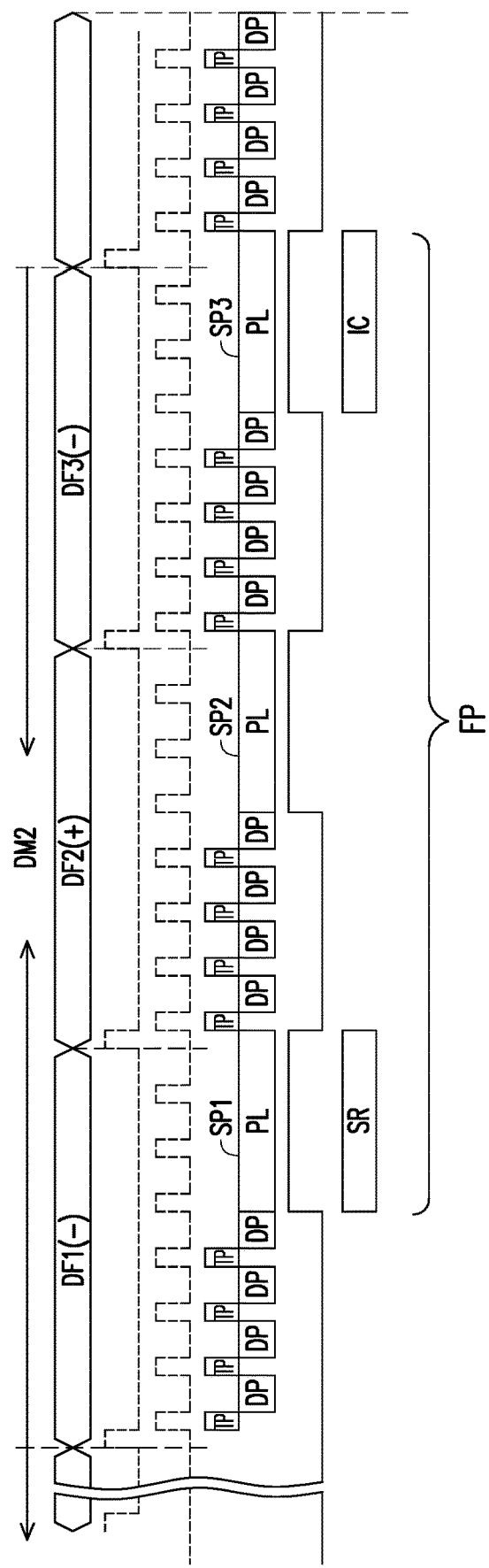
FIG. 23 is a timing diagram of multiple frame periods according to still another embodiment of the disclosure.
Figure 24:
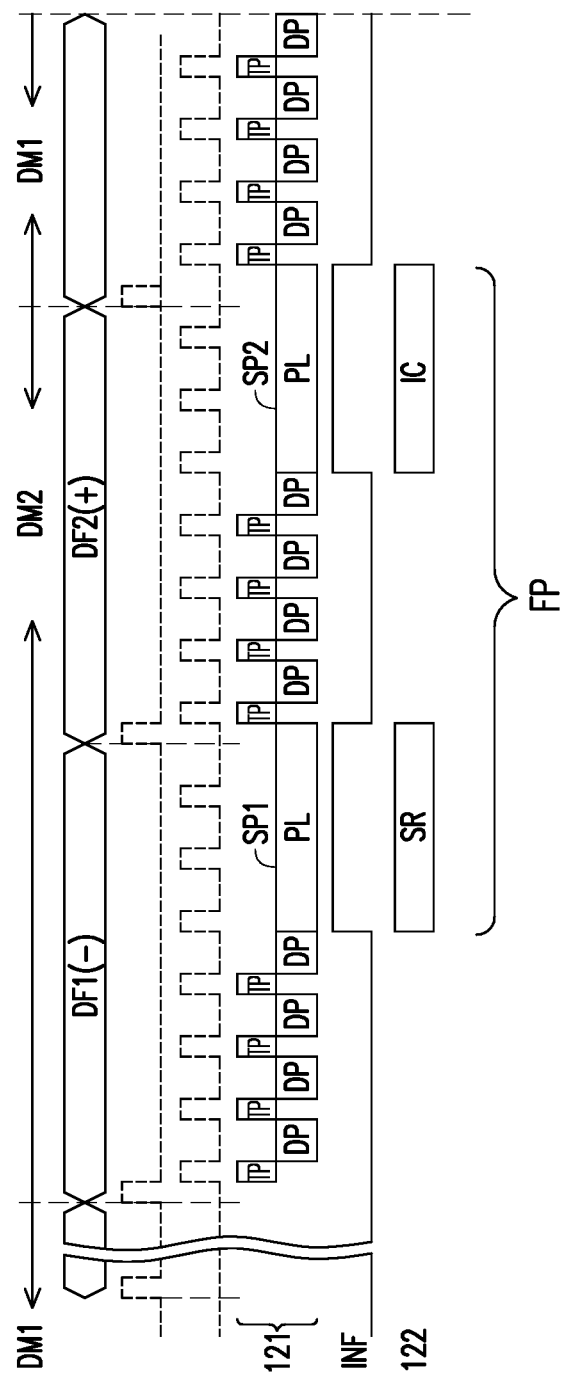
FIG. 24 is a timing diagram of multiple frame periods according to still another embodiment of the disclosure.
Figure 25:
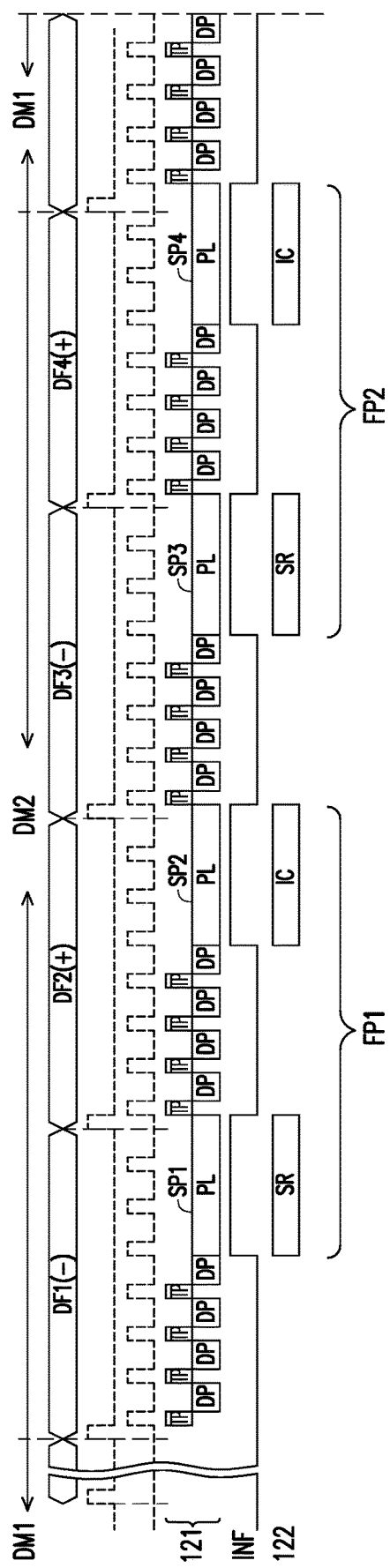
FIG. 25 is a timing diagram of multiple frame periods according to still another embodiment of the disclosure.
Figure 26:
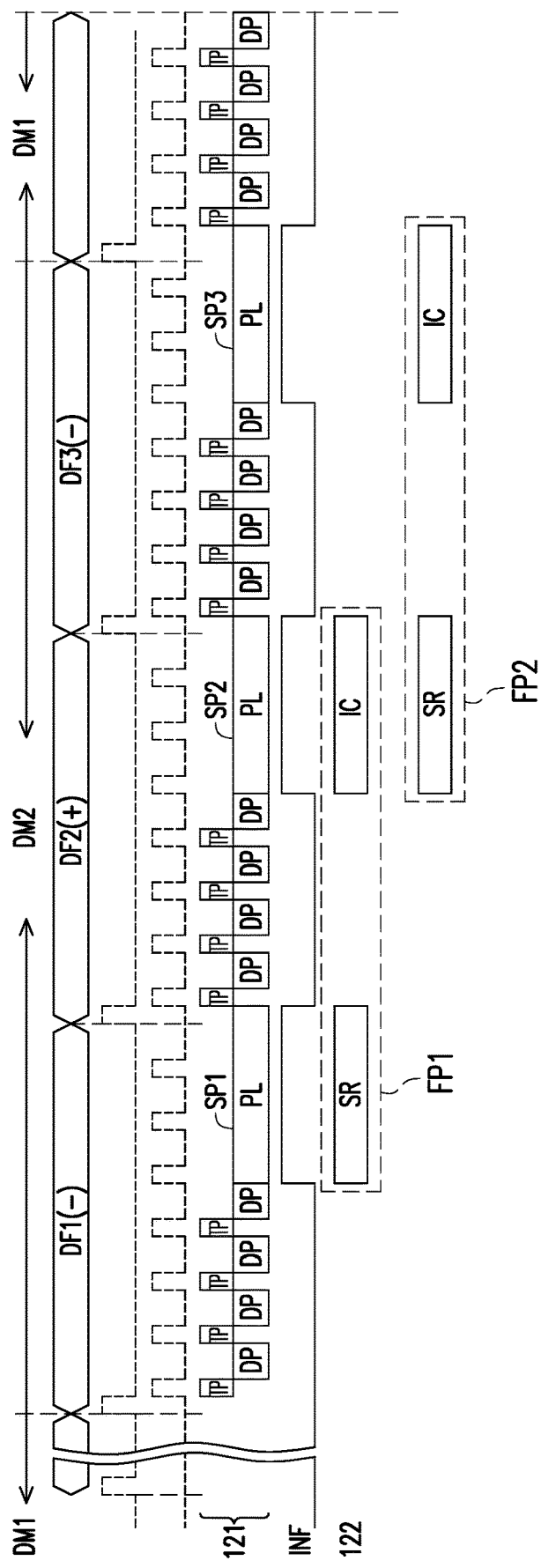
FIG. 26 is a timing diagram of multiple frame periods according to still another embodiment of the disclosure.

According to FIG. 23, the sensor reset operation SR and the image capture operation IC are both performed during the porch interval PL in the display frame period when the frame polarity of the display panel is configured as the negative polarity configuration, and the exposure time length is 2 display frames. According to FIG. 24, the sensor reset operation SR is performed during the porch interval PL of the display frame period when the frame polarity configuration of the display panel is the negative polarity configuration, and the image capture operation IC is performed during the porch interval PL of the display frame period when the frame polarity configuration of the display panel is the positive polarity configuration. Therefore, if a sufficient length of the porch interval PL period can be appropriately designed, the time for performing a fingerprint sensing operation on a fingerprint sensing area to obtain a fingerprint frame is 2 display frame periods. The frame polarity configuration rule for the fingerprint sensing operation described in FIG. 25 is the same as that of FIG. 24. The difference from FIG. 25 is that the second driving circuit 122 performs two fingerprint sensing operations FP1 and FP2 on the same fingerprint sensing area to generate two fingerprint frames. FIG. 26 illustrates that the second driving circuit 122 performs two fingerprint sensing operations FP1 and FP2 on the same fingerprint sensing area, and the frame polarity configuration rules of the two fingerprint sensing operations FP1 and FP2 are different.

According to different design requirements, the implementation manners of the blocks of the driving device 120, the first driving circuit 121, and/or the second driving circuit 122 may be hardware, firmware, software (i.e. program), or a combination of multiple of the three.

In terms of hardware, the blocks of the driving device 120, the first driving circuit 121, and/or the second driving circuit 122 may be implemented as a logic circuit on an integrated circuit. The relevant functions of the driving device 120, the first driving circuit 121, and/or the second driving circuit 122 may be implemented as hardware using hardware description languages (for example, Verilog HDL or VHDL) or other suitable programming languages. For example, the relevant functions of the driving device 120, the first driving circuit 121, and/or the second driving circuit 122 may be implemented in various logic blocks, modules, and circuits in one or more controllers, microcontrollers, microprocessors, application-specific integrated circuit (ASIC), digital signal processor (DSP), field programmable gate array (FPGA), and/or other processing units.

In terms of software and/or firmware, the relevant functions of the driving device 120, the first driving circuit 121, and/or the second driving circuit 122 may be implemented as programming codes. For example, the driving device 120, the first driving circuit 121, and/or the second driving circuit 122 are implemented using general programming languages (for example, C, C++, or assembly language) or other suitable programming languages. The programming codes may be recorded/stored in a recording medium. The recording medium, for example, includes a read only memory (ROM), a storage device, and/or a random access memory (RAM). A computer, a central processing unit (CPU), a controller, a microcontroller, or a microprocessor may read and perform the programming codes from the recording medium to achieve the relevant functions. As the recording medium, "non-transitory computer readable medium", for example, tape, disk, card, semiconductor memory, or programmable logic circuits, etc. may be used. Moreover, the program may also be provided to the computer (or CPU) via any transmission medium (communication network, broadcast radio wave, etc.). The communication network is, for example, the Internet, wired communication, wireless communication, or other communication mediums.

In summary, the driving device 120 and the operation method thereof according to the above embodiments may perform the fingerprint sensing operation FP (sensor reset operation SR and image capture operation IC) on the display panel 110 having the fingerprint sensing function with the same frame polarity configuration rule. In this way, the quality of a fingerprint image can be improved as much as possible. Alternatively, the driving device 120 and its operating method can obtain multiple fingerprint frames under different frame polarity configuration rules and then process these fingerprint frames for signal processing, which can also improve the quality of the fingerprint image.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving device, configured to drive a display panel, the driving device comprising:
    a first driving circuit, configured to perform a display driving operation on the display panel, wherein the first driving circuit controls the display panel to perform polarity inversion between a plurality of frame polarity configurations when a plurality of display frames are displayed continuously, and the first driving circuit outputs a timing control signal; and
    a second driving circuit, coupled to the first driving circuit to receive the timing control signal, and configured to perform a fingerprint sensing operation on the display panel according to the timing control signal, and the fingerprint sensing operation is performed with a same frame polarity configuration rule, wherein
    the fingerprint sensing operation comprises a sensor reset operation and an image capture operation, the frame polarity configuration of the display panel when performing the sensor reset operation on a same fingerprint sensing area is referred to as a first polarity configuration and the frame polarity configuration of the display panel when performing the image capture operation on the same fingerprint sensing area is referred to as a second polarity configuration, and
    the operation of "the fingerprint sensing operation is performed with the same frame polarity configuration rule" comprises fixing a relation between the first polarity configuration and the second polarity configuration whenever the fingerprint sensing operation is performed.

2. The driving device according to claim 1, wherein the first driving circuit is further configured to perform a touch sensing operation on the display panel.

3. The driving device according to claim 1, wherein the polarity configurations of the display panel comprise a positive polarity configuration and a negative polarity configuration, and each of the first polarity configuration and the second polarity configuration is the positive polarity configuration whenever the fingerprint sensing operation is performed.

4. The driving device according to claim 1, wherein the polarity configurations of the display panel comprise a positive polarity configuration and a negative polarity configuration, and each of the first polarity configuration and the second polarity configuration is the negative polarity configuration whenever the fingerprint sensing operation is performed.

5. The driving device according to claim 1, wherein the polarity configurations of the display panel comprise a positive polarity configuration and a negative polarity configuration, and the first polarity configuration is the positive polarity configuration and the second polarity configuration is the negative polarity configuration whenever the fingerprint sensing operation is performed.

6. The driving device according to claim 1, wherein the polarity configurations of the display panel comprise a positive polarity configuration and a negative polarity configuration, and the first polarity configuration is the negative polarity configuration and the second polarity configuration is the positive polarity configuration whenever the fingerprint sensing operation is performed.

7. The driving device according to claim 1, wherein
when an application processor sends a fingerprint sensing request, the first driving circuit checks a frame polarity configuration of a current display frame;
when the frame polarity configuration of the current display frame meets the frame polarity configuration rule, the first driving circuit notifies the second driving circuit with the timing control signal, such that the second driving circuit performs the fingerprint sensing operation on the display panel with the frame polarity configuration rule in a frame period after the current display frame ends; and
when the frame polarity configuration of the current display frame does not meet the frame polarity configuration rule, the first driving circuit continues to perform the display driving operation after the current display frame ends, such that the display panel displays a next display frame meeting the frame polarity configuration rule, and the first driving circuit notifies the second driving circuit with the timing control signal, such that the second driving circuit performs the fingerprint sensing operation on the display panel with the frame polarity configuration rule in a frame period after the next display frame ends.

8. The driving device according to claim 1, wherein when an application processor sends a fingerprint sensing request, the second driving circuit performs the fingerprint sensing operation on the display panel with the frame polarity configuration rule in a frame period after a current display frame corresponding to the fingerprint sensing request ends.

9. The driving device according to claim 1, wherein the sensor reset operation on the same fingerprint sensing area is performed in a first skip period between a first display frame period and a second display frame period, and the image capture operation on the same fingerprint sensing area is performed in a second skip period between the second display frame period and a third display frame period.

10. The driving device according to claim 1, wherein a skip period comprises a plurality of frame periods, the first driving circuit skips the display driving operation in the frame periods, the sensor reset operation on the same fingerprint sensing area is performed in a first frame period among the frame periods, and the image capture operation on the same fingerprint sensing area is performed in a second frame period among the frame periods.

11. The driving device according to claim 1, wherein the sensor reset operation on the same fingerprint sensing area is performed in a first display frame period, the image capture operation on the same fingerprint sensing area is performed in a second display frame period, and the first driving circuit performs the display driving operation in the first display frame period and the second display frame period.

12. The driving device according to claim 1, wherein the sensor reset operation and the image capture operation for the same fingerprint sensing area are performed during a porch interval in a display frame period.

13. The driving device according to claim 1, wherein the sensor reset operation for the same fingerprint sensing area is performed during a porch interval in a first display frame period, and the image capturing operation for the same fingerprint sensing area is performed during a porch interval in a second display frame period after the first display frame period, wherein the second display frame period immediately follows the first display frame period, or there is a gap of at least one display frame period between the second display frame period and the first display frame period.

14. An operation method of a driving device configured to drive a display panel, comprising:
performing a display driving operation on the display panel by a first driving circuit, wherein the first driving circuit controls the display panel to perform polarity inversion between a plurality of frame polarity configurations when multiple display frames are displayed continuously;
outputting a timing control signal to a second driving circuit by the first driving circuit; and
performing a fingerprint sensing operation on the display panel according to the timing control signal by the second driving circuit, wherein the fingerprint sensing operation is performed with a same frame polarity configuration rule, wherein
the fingerprint sensing operation comprises a sensor reset operation and an image capture operation, the frame polarity configuration of the display panel when performing the sensor reset operation on a same fingerprint sensing area is referred to as a first polarity configuration, and the frame polarity configuration of the display panel when performing the image capture operation on the same fingerprint sensing area is referred to as a second polarity configuration, and
the step of "the fingerprint sensing operation is performed with the same frame polarity configuration rule" comprises fixing a relation between the first polarity configuration and the second polarity configuration whenever the fingerprint sensing operation is performed.

15. The operation method according to claim 14, further comprising:

performing a touch sensing operation on the display panel by the first driving circuit.

16. The operation method according to claim 14, wherein the polarity configurations of the display panel comprise a positive polarity configuration and a negative polarity configuration, and each of the first polarity configuration and the second polarity configuration is the positive polarity configuration whenever the fingerprint sensing operation is performed.

17. The operation method according to claim 14, wherein the polarity configurations of the display panel comprise a positive polarity configuration and a negative polarity configuration, and each of the first polarity configuration and the second polarity configuration is the negative polarity configuration whenever the fingerprint sensing operation is performed.

18. The operation method according to claim 14, wherein the polarity configurations of the display panel comprise a positive polarity configuration and a negative polarity configuration, and the first polarity configuration is the positive polarity configuration and the second polarity configuration is the negative polarity configuration whenever the fingerprint sensing operation is performed.

19. The operation method according to claim 14, wherein the polarity configurations of the display panel comprise a positive polarity configuration and a negative polarity configuration, and the first polarity configuration is the negative polarity configuration and the second polarity configuration is the positive polarity configuration whenever the fingerprint sensing operation is performed.

20. The operation method according to claim 14, further comprising:
checking a frame polarity configuration of a current display frame by the first driving circuit when an application processor sends a fingerprint sensing request;
notifying the second driving circuit with the timing control signal by the first driving circuit when the frame polarity configuration of the current display frame meets the frame polarity configuration rule, such that the second driving circuit performs the fingerprint sensing operation on the display panel with the frame polarity configuration rule according to the timing control signal in a frame period after the current display frame ends; and
continuing to perform the display driving operation by the first driving circuit after the current display frame ends when the frame polarity configuration of the current display frame does not meet the frame polarity configuration rule, such that the display panel displays a next display frame meeting the frame polarity configuration rule, and notifying the second driving circuit with the timing control signal by the first driving circuit, such that the second driving circuit performs the fingerprint sensing operation on the display panel with the frame polarity configuration rule in a frame period after the next display frame ends.

21. The operation method according to claim 14, further comprising:
performing the fingerprint sensing operation on the display panel with the frame polarity configuration rule by the second driving circuit in a frame period after a current display frame corresponding to a fingerprint sensing request ends when an application processor sends the fingerprint sensing request.

22. The operation method according to claim 14, wherein the sensor reset operation on the same fingerprint sensing area is performed in a first skip period between a first display frame period and a second display frame period, and the image capture operation on the same fingerprint sensing area is performed in a second skip period between the second display frame period and a third display frame period.

23. The operation method according to claim 14, wherein a skip period comprises a plurality of frame periods, the operation method further comprising:
skipping the display driving operation by the first driving circuit in the frame periods, wherein the sensor reset operation on the same fingerprint sensing area is performed in a first frame period among the frame periods and the image capture operation on the same fingerprint sensing area is performed in a second frame period among the frame periods.

24. The operation method according to claim 14, wherein the sensor reset operation on the same fingerprint sensing area is performed in a first display frame period and the image capture operation on the same fingerprint sensing area is performed in a second display frame period among the frame periods, the operation method further comprising:
performing the display driving operation by the first driving circuit in the first display frame period and the second display frame period.

25. The operation method according to claim 14, wherein the sensor reset operation and the image capture operation for the same fingerprint sensing area are performed during a porch interval in a display frame period.

26. The operation method according to claim 14, wherein the sensor reset operation for the same fingerprint sensing area is performed during a porch interval in a first display frame period, and the image capturing operation for the same fingerprint sensing area is performed during a porch interval in a second display frame period after the first display frame period, wherein the second display frame period immediately follows the first display frame period, or there is a gap of at least one display frame period between the second display frame period and the first display frame period.

27. A driving device, configured to drive a display panel, the driving device comprising:
a first driving circuit, configured to perform a display driving operation on the display panel, wherein the first driving circuit controls the display panel to perform polarity inversion between a plurality of frame polarity configurations when a plurality of display frames are displayed continuously, and the first driving circuit outputs a timing control signal; and
a second driving circuit, coupled to the first driving circuit to receive the timing control signal and configured to perform a first fingerprint frame sensing operation and a second fingerprint frame sensing operation on a fingerprint sensing area of the display panel to respectively obtain a first fingerprint frame and a second fingerprint frame, wherein the frame polarity configuration of the display panel when the first fingerprint frame sensing operation is performed is different from the frame polarity configuration of the display panel when the second fingerprint frame sensing operation is performed.

28. The driving device according to claim 27, wherein the second driving circuit is configured to generate a fingerprint frame to be output according to at least the first fingerprint frame and the second fingerprint frame.

29. The driving device according to claim 27, wherein the first driving circuit is further configured to perform a touch sensing operation on the display panel.

30. The driving device according to claim 27, wherein the polarity configurations of the display panel comprise a positive polarity configuration and a negative polarity configuration, the first fingerprint frame sensing operation comprises a first sensor reset operation and a first image capture operation, the second fingerprint frame sensing operation comprises a second sensor reset operation and a second image capture operation, the second driving circuit performs the first sensor reset operation when the display panel is in the positive polarity configuration, the second driving circuit performs the first image capture operation when the display panel is in the negative polarity configuration, the second driving circuit performs the second sensor reset operation when the display panel is in the negative polarity configuration, and the second driving circuit performs the second image capture operation when the display panel is in the positive polarity configuration.

31. The driving device according to claim 27, wherein the polarity configurations of the display panel comprise a positive polarity configuration and a negative polarity configuration, the first fingerprint frame sensing operation comprises a first sensor reset operation and a first image capture operation, the second fingerprint frame sensing operation comprises a second sensor reset operation and a second image capture operation, the second driving circuit performs the first sensor reset operation when the display panel is in the negative polarity configuration, the second driving circuit performs the first image capture operation when the display panel is in the positive polarity configuration, the second driving circuit performs the second sensor reset operation when the display panel is in the positive polarity configuration, and the second driving circuit performs the second image capture operation when the display panel is in the negative polarity configuration.

32. The driving device according to claim 27, wherein the first fingerprint frame sensing operation comprises a first sensor reset operation and a first image capture operation, the second fingerprint frame sensing operation comprises a second sensor reset operation and a second image capture operation, the first sensor reset operation is performed in a first skip period between a first display frame period and a second display frame period, the first image capture operation and the second sensor reset operation are performed in a second skip period between the second display frame period and a third display frame period, and the second image capture operation is performed in a third skip period after the third display frame period.

33. The driving device according to claim 27, wherein the first fingerprint frame sensing operation comprises a first sensor reset operation and a first image capture operation, the second fingerprint frame sensing operation comprises a second sensor reset operation and a second image capture operation, the first sensor reset operation is performed in a first display frame period, the first image capture operation and the second sensor reset operation are performed in a second display frame period after the first display frame period, and the second image capture operation is performed in a third display frame period after the second display frame period.

34. The driving device according to claim 27, wherein the sensor reset operation and the image capture operation for a same fingerprint sensing operation are performed during a porch interval in a display frame period.

35. The driving device according to claim 27, wherein the sensor reset operation in any fingerprint frame sensing operation is performed during a porch interval in a first display frame period, and the image capturing operation in any fingerprint frame sensing operation is performed during a porch interval in a second display frame period after the first display frame period, wherein the second display frame period is immediately follows the first display frame period, or there is a gap of at least one display frame period between the second display frame period and the first display frame period.

36. An operation method of a driving device configured to drive a display panel, comprising:
performing a display driving operation on the display panel by a first driving circuit, wherein the first driving circuit controls the display panel to perform polarity inversion between a plurality of frame polarity configurations when multiple display frames are displayed continuously;
outputting a timing control signal to a second driving circuit based on the display driving operation by the first driving circuit; and
performing a first fingerprint frame sensing operation and a second fingerprint frame sensing operation on a fingerprint sensing area of the display panel according to the timing control signal by the second driving circuit to respectively obtain a first fingerprint frame and a second fingerprint frame, wherein the frame polarity configuration of the display panel when the first fingerprint frame sensing operation is performed is different from the frame polarity configuration of the display panel when the second fingerprint frame sensing operation is performed.

37. The operation method according to claim 36, further comprising:
generating a fingerprint frame to be output according to at least the first fingerprint frame and the second fingerprint frame by the second driving circuit.

38. The operation method according to claim 36, further comprising:
performing a touch sensing operation on the display panel by the first driving circuit.

39. The operation method according to claim 36, wherein the polarity configurations of the display panel comprise a positive polarity configuration and a negative polarity configuration, the first fingerprint frame sensing operation comprises a first sensor reset operation and a first image capture operation, and the second fingerprint frame sensing operation comprises a second sensor reset operation and a second image capture operation, the operation method further comprising:
performing the first sensor reset operation by the second driving circuit when the display panel is in the positive polarity configuration;
performing the first image capture operation by the second driving circuit when the display panel is in the negative polarity configuration;
performing the second sensor reset operation by the second driving circuit when the display panel is in the negative polarity configuration; and
performing the second image capture operation by the second driving circuit when the display panel is in the positive polarity configuration.

40. The operation method according to claim 36, wherein the polarity configurations of the display panel comprise a positive polarity configuration and a negative polarity configuration, the first fingerprint frame sensing operation comprises a first sensor reset operation and a first image capture operation, and the second fingerprint frame sensing operation comprises a second sensor reset operation and a second image capture operation, the operation method further comprising:
  performing the first sensor reset operation by the second driving circuit when the display panel is in the negative polarity configuration;
  performing the first image capture operation by the second driving circuit when the display panel is in the positive polarity configuration;
  performing the second sensor reset operation by the second driving circuit when the display panel is in the positive polarity configuration; and
  performing the second image capture operation by the second driving circuit when the display panel is in the negative polarity configuration.

41. The operation method according to claim 36, wherein the first fingerprint frame sensing operation comprises a first sensor reset operation and a first image capture operation, and the second fingerprint frame sensing operation comprises a second sensor reset operation and a second image capture operation, the operation method further comprising:
  performing the first sensor reset operation in a first skip period between a first display frame period and a second display frame period;
  performing the first image capture operation and the second sensor reset operation in a second skip period between the second display frame period and a third display frame period; and
  performing the second image capture operation in a third skip period after the third display frame period.

42. The operation method according to claim 36, wherein the first fingerprint frame sensing operation comprises a first sensor reset operation and a first image capture operation, and the second fingerprint frame sensing operation comprises a second sensor reset operation and a second image capture operation, the operation method further comprising:
  performing the first sensor reset operation in a first display frame period;
  performing the first image capture operation and the second sensor reset operation in a second display frame period after the first display frame period; and
  performing the second image capture operation in a third display frame period after the second display frame period.

43. The operation method according to claim 36, wherein the sensor reset operation and the image capture operation for a same fingerprint sensing operation are performed during a porch interval in a display frame period.

44. The operation method according to claim 36, wherein the sensor reset operation in any fingerprint frame sensing operation is performed during a porch interval in a first display frame period, and the image capturing operation in any fingerprint frame sensing operation is performed during a porch interval in a second display frame period after the first display frame period, wherein the second display frame period is immediately follows the first display frame period, or there is a gap of at least one display frame period between the second display frame period and the first display frame period.

* * * * *